United States Patent
Fujita et al.

(10) Patent No.: US 11,420,674 B2
(45) Date of Patent: Aug. 23, 2022

(54) ROTATION DETECTION DEVICE AND ELECTRIC POWER STEERING APPARATUS USING THE SAME

(71) Applicant: DENSO CORPORATION, Kariya (JP)

(72) Inventors: Toshihiro Fujita, Kariya (JP); Nobuyori Nakajima, Kariya (JP); Masaya Taki, Kariya (JP); Takahiro Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 588 days.

(21) Appl. No.: 16/530,091

(22) Filed: Aug. 2, 2019

(65) Prior Publication Data
US 2020/0039579 A1 Feb. 6, 2020

(30) Foreign Application Priority Data
Aug. 6, 2018 (JP) .............................. JP2018-147607

(51) Int. Cl.
| | |
|---|---|
| *B62D 5/04* | (2006.01) |
| *B62D 15/02* | (2006.01) |
| *G01D 18/00* | (2006.01) |
| *G01D 5/16* | (2006.01) |
| *G01D 5/14* | (2006.01) |

(52) U.S. Cl.
CPC ......... *B62D 5/0481* (2013.01); *B62D 15/024* (2013.01); *G01D 5/145* (2013.01); *G01D 5/16* (2013.01); *G01D 18/00* (2013.01)

(58) Field of Classification Search
CPC ..... B62D 5/0481; B62D 15/024; G01D 5/145
See application file for complete search history.

(56) References Cited

U.S. PATENT DOCUMENTS

| | | | |
|---|---|---|---|
| 2006/0145652 A1* | 7/2006 | Ta | ........................... H02P 21/04<br>318/807 |
| 2012/0306328 A1* | 12/2012 | Fujita | .................. H01L 23/4093<br>257/E23.084 |
| 2015/0239501 A1 | 8/2015 | Fujita et al. | |

(Continued)

FOREIGN PATENT DOCUMENTS

| | | |
|---|---|---|
| JP | 2003-276635 A | 10/2003 |
| JP | 2015-15566 A | 1/2015 |

(Continued)

OTHER PUBLICATIONS

U.S. Appl. No. 16/423,497, filed May 28, 2019, Takahiro Suzuki.
U.S. Appl. No. 16/423,481, filed May 28, 2019, Takahiro Suzuki.
U.S. Appl. No. 16/423,478, filed May 28, 2019, Toshihiro Fujita.

*Primary Examiner* — Alvaro E Fortich
(74) *Attorney, Agent, or Firm* — Maschoff Brennan

(57) ABSTRACT

An ECU includes plural sensor units and plural control units. The sensor units include magnetic field detection elements for detecting a rotation of a motor, and output mechanical angles related to the rotation angle in one rotation and count values related to the number of rotations of the motor, respectively. One rotation of the motor is divided into indefinite regions, in which detection deviation of the count values may occur, and definite regions, in which no detection deviation occurs. The definite region of the count value is set to deviate from the definite region of the other count value. Absolute angle calculation units calculate the absolute angles using the count values of the definite regions.

10 Claims, 16 Drawing Sheets

(56) References Cited

U.S. PATENT DOCUMENTS

| | | | |
|---|---|---|---|
| 2016/0231142 A1* | 8/2016 | Kawano | ............... B62D 5/049 |
| 2016/0339958 A1* | 11/2016 | Fujita | ................ B62D 15/021 |
| 2017/0291640 A1 | 10/2017 | Fujita et al. | |
| 2018/0229761 A1 | 8/2018 | Fujita et al. | |

FOREIGN PATENT DOCUMENTS

| | | |
|---|---|---|
| JP | 5958572 B2 | 8/2016 |
| JP | 2017-0191092 A | 10/2017 |
| JP | 2017-191093 A | 10/2017 |
| JP | 2018-128429 A | 8/2018 |

* cited by examiner

ROTATION DETECTION DEVICE AND ELECTRIC POWER STEERING APPARATUS USING THE SAME

CROSS REFERENCE TO RELATED APPLICATION

The present disclosure is based on Japanese Patent Application No. 2018-147607 filed on Aug. 6, 2018, the whole contents of which are incorporated herein by reference.

FIELD

The present disclosure relates to a rotation detection device and an electric power steering apparatus using the same.

BACKGROUND

A rotation angle detection device, which detects information varying with a rotation of a motor, is known conventionally. For example, information related to a rotation angle and information on the number of rotations respectively calculated by a rotation angle sensor are transmitted to a control unit so that the control unit calculates a steering angle based on the rotation angle and the number of rotations.

SUMMARY

A rotation detection device according to the present disclosure comprises plural sensor units and a control unit. Each sensor unit includes at least one detection element for detecting a rotation of a motor and outputs first rotation information related to a rotation angle in one rotation of the motor and second rotation information related to a number of rotations of the motor. The control unit includes a signal acquisition unit for acquiring the first rotation information and the second rotation information from the sensor unit, and an absolute angle calculation unit for calculating an absolute angle indicating a rotation amount from a reference position based on the first rotation information and the second rotation information.

EMBODIMENT

First Embodiment

Figure 1:
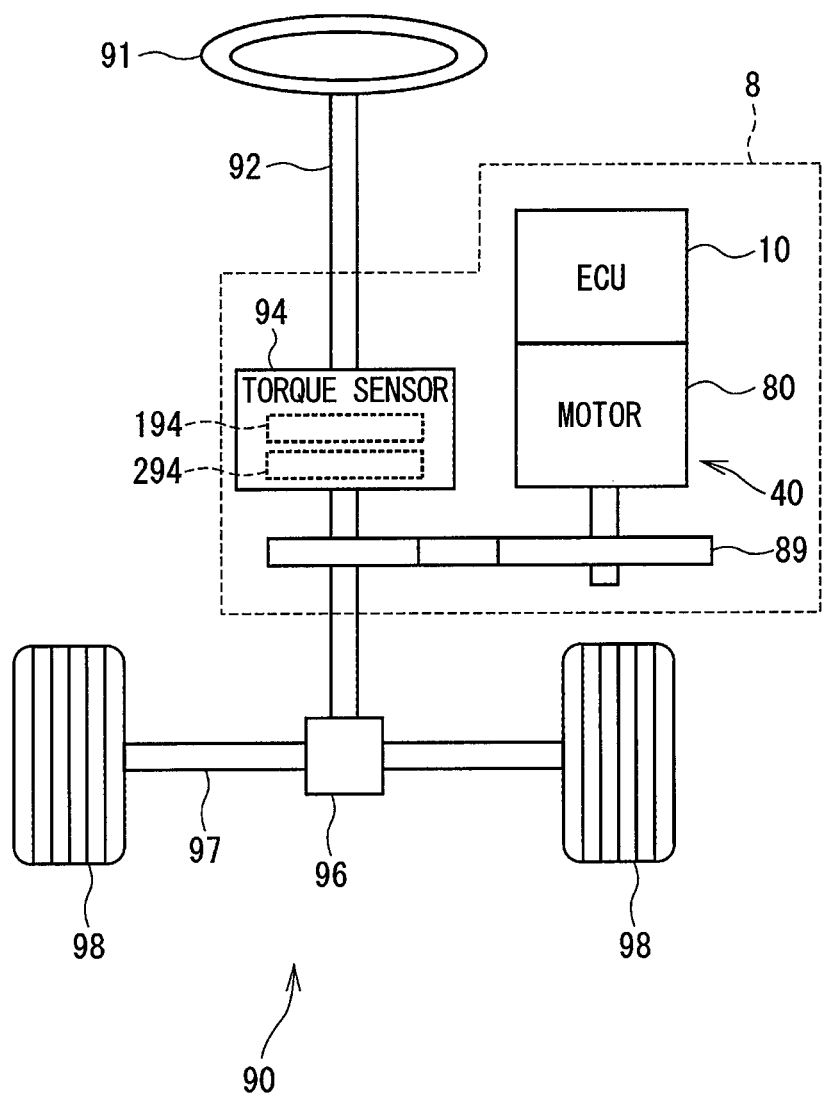
FIG. 1 is a schematic structural diagram showing a steering system according to a first embodiment.

A rotation detection device and an electric power steering apparatus using such a rotation detection device will be described below with reference to the drawings. In the following plural embodiments, substantially same structural configurations are designated with the same reference numerals thereby to simplify the description.

As shown in FIG. 1, an ECU 10, which is provided as a rotation detection device according to a first embodiment, is applied to an electric power steering apparatus 8, together with a motor 80 serving as a rotating electric machine, for assisting a steering operation of a vehicle. FIG. 1 shows an overall configuration of a steering system 90 including the electric power steering apparatus 8. The steering system 90 includes a steering wheel 91 which is a steering member, a steering shaft 92, a pinion gear 96, a rack shaft 97, a pair of road wheels 98 and the electric power steering apparatus 8.

The steering wheel 91 is connected to the steering shaft 92. A torque sensor 94 is provided on the steering shaft 92 to detect a steering torque Ts. The torque sensor 94 includes a first torque detection unit 194 and a second torque detection unit 294. The pinion gear 96 is provided at an axial end of the steering shaft 92. The pinion gear 96 meshes with the rack shaft 97. The road wheels 98 are coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The road wheels 98 are steered to an angle corresponding to a displacement amount of the rack shaft 97.

The electric power steering apparatus 8 includes a driving device 40, which includes the motor 80 and the ECU 10, and includes a reduction gear 89 or the like as a power transmission mechanism that reduces the rotation of the motor 80 and transmits the rotation of the motor 80 to the steering shaft 92. The electric power steering apparatus 8 of the present embodiment is a column assist type. It may alternatively be a rack assist type that transmits the rotation of the motor 80 to the rack shaft 97. In the present embodiment, the steering shaft 92 is a driven object of the driving device 40.

Figure 2:
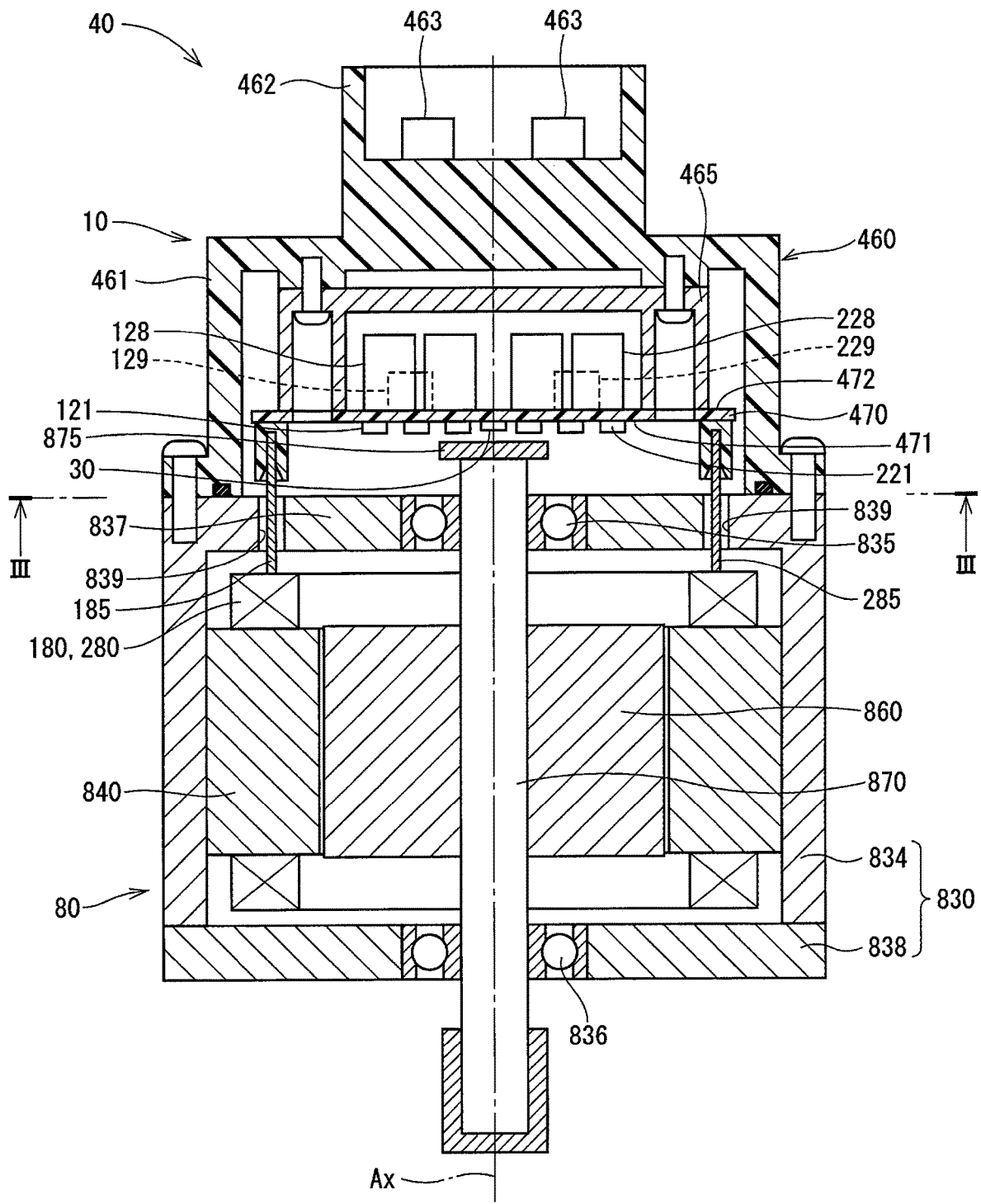
FIG. 2 is a cross-sectional view showing a driving device according to the first embodiment.
Figure 3:
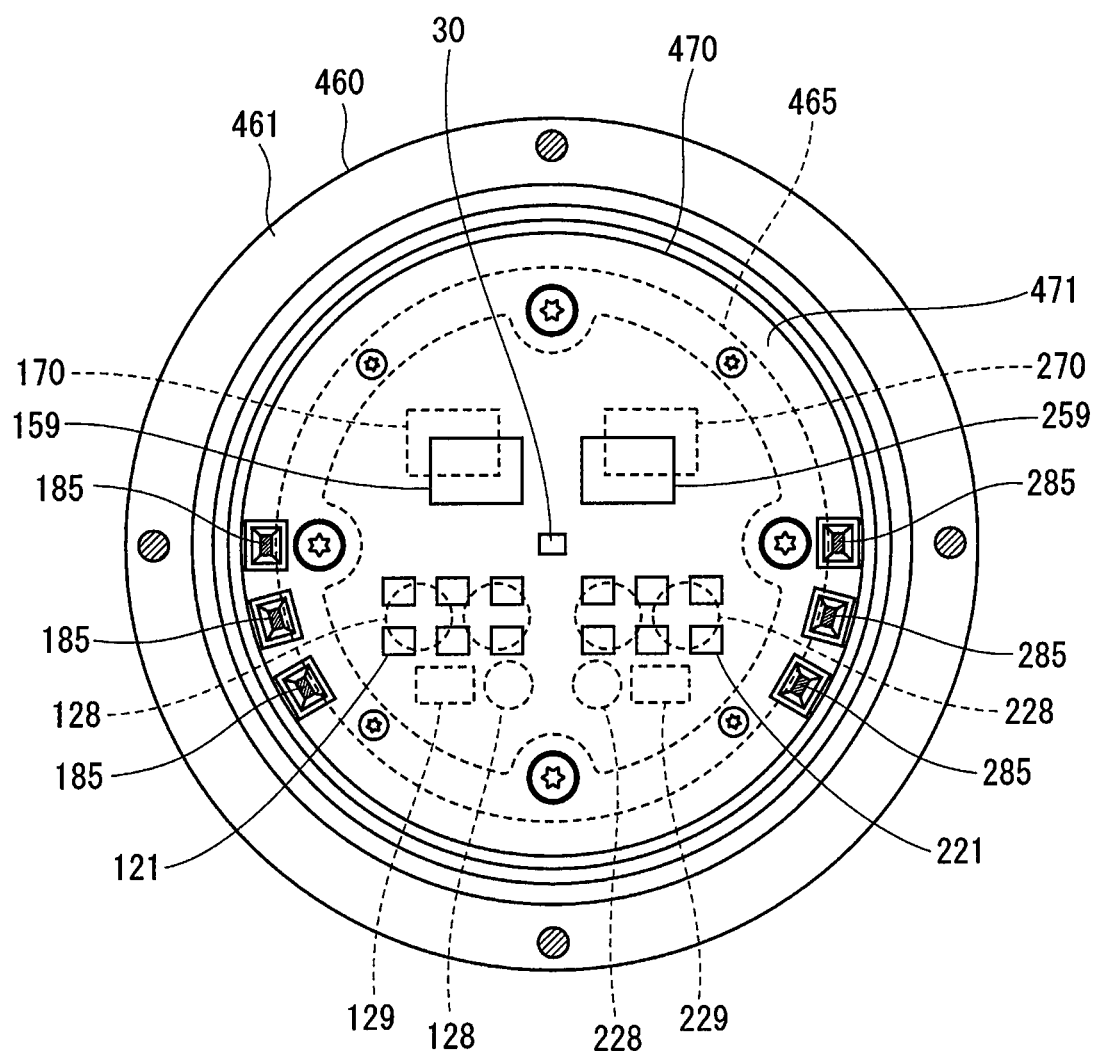
FIG. 3 is a cross-sectional view taken along a line III-III in FIG. 2.

As shown in FIG. 2 and FIG. 3, the motor 80 outputs a whole or a part of an assist torque required for a steering operation. The motor 80 is driven with electric power supplied from batteries 191 and 291 (see FIG. 4) to rotate the reduction gear 89 in forward and reverse directions. The motor 80 is a three-phase brushless motor and has a rotor 860 and a stator 840 as shown in FIG. 2.

The motor 80 has a first motor winding 180 and a second motor winding 280 as a winding set. The motor windings 180 and 280 have the same electrical characteristics and are wound on the stator 840 with electrical angles shifted from each other by 30°. Correspondingly, phase currents are controlled to be supplied to the motor windings 180 and 280 such that the phase currents have a phase difference φ of 30°. By optimizing a current supply phase difference, the output torque is improved. It is possible to reduce sixth-order torque ripple. Furthermore, it is possible to maximize advantages of cancellation of noise and vibration since the current is averaged by the current supply with phase difference. Heat generation is also averaged. Therefore, it may be possible to reduce error between the systems depending on temperature such as detection values of each sensor or torque, and it may be possible to average a current amount capable of energization.

Hereinafter, a combination of a first driver circuit 120, a first sensor unit 130, a first control unit 170 and the like, which are related to the drive control for the first motor winding 180, is referred to as a first system L1, and a combination of a second driver circuit 220, a second sensor unit 230, a second control unit 270 and the like, which are related to the drive control for the second motor winding 280, is referred to as a second system L2. The configuration related to the first system L1 is basically indicated with reference numerals of 100, and the configuration related to the second system L2 is basically indicated with reference numerals of 200. In the first system L1 and the second system L2, same or similar configurations are indicated with same reference numbers in the least significant two digits. For the other configurations described below, the term "first" is indicated with a suffix "1," and the term "second" is indicated with a suffix "2."

In the driving device 40, the ECU 10 is integrally provided on one side in an axial direction of the motor 80. That is, the driving device 40 is provided in a mechanically-electrically integrated type. The motor 80 and the ECU 10 may alternatively be placed separately. The ECU 10 is positioned coaxially with an axis Ax of the shaft 870 on the side opposite to the output shaft of the motor 80. The ECU 10 may alternatively be provided on the output shaft side of the motor 80. By adopting the mechanically-electrically integrated type, it may be possible to efficiently position the ECU 10 and the motor 80 in a vehicle having restriction for a mounting space.

The motor 80 includes, in addition to the stator 840 and rotor 860, a housing 830 that houses the stator 840 and the rotor 860, and the like. The stator 840 is fixed to the housing 830 and the motor windings 180 and 280 are wound thereon. The rotor 860 is placed radially inside the stator 840 to be rotatable relative to the stator 840.

The shaft 870 is fitted in the rotor 860 to rotate integrally with the rotor 860. The shaft 870 is rotatably supported by the housing 830 via bearings 835 and 836. The end portion of the shaft 870 on the ECU 10 side protrudes from the housing 830 toward the ECU 10 in the axial direction. A magnet 875 is provided at an axial end of the shaft 870 on the ECU 10 side.

The housing 830 has a bottomed cylindrical case 834 including region end frame 837, and has a front end frame 838 placed on an open side of the case 834. The case 834 and the front end frame 838 and are fastened to each other by bolts or the like. Lead wire insertion holes 839 are formed in the rear end frame 837. Lead wires 185 and 285 connected to each phase of the motor windings 180 and 280 are inserted through the lead wire insertion holes 839. The lead wires 185 and 285 are taken out from the lead wire insertion holes 839 to the ECU 10 side and connected to a circuit board 470 of the ECU 10.

The ECU 10 includes a cover 460 and a heat sink 465 fixed to the cover 460 in addition to the circuit board 470 fixed to the heat sink 465. The ECU 10 further includes various electronic components and the like mounted on the circuit board 470.

The cover 460 protects electronic components from external impacts and prevents dust, water or the like from entering into the ECU 10. In the cover 460, a cover main body 461 and a connector member 462 are integrally formed. The connector member 462 may alternatively be separated from the cover main body 461. Terminals 463 of the connector member 462 are connected to the circuit board 470 via a wiring (not shown) or the like. The number of connectors and the number of terminals may be changed in correspondence to the number of signals and the like. The connector member 462 is provided at the end portion in the axial direction of the driving device 40 and is open on the side opposite to the motor 80.

The circuit board 470 is, for example, a printed circuit board, and is positioned to face the rear end frame 837 of the motor 80. On the circuit board 470, the electronic components of the first and second systems L1 and L2 are mounted independently for each system so that the two systems L1 and L2 are provided in a fully redundant configuration. According to the present embodiment, the electronic components are mounted on one circuit board 47. The electronic components may alternatively be mounted on plural circuit boards.

Of the two principal surfaces of the circuit board 470, one surface on the side of the motor 80 is referred to as a motor-side surface 471 and the other surface opposite from the motor 80 is referred to as a cover-side surface 472. As shown in FIG. 3, switching elements 121 configuring a driver circuit 120, switching elements 221 configuring a driver circuit 220, a rotation angle sensor 30 as a sensor unit, custom ICs 159, 259 and the like are mounted on the motor-side surface 471. The rotation angle sensor 30 is mounted at a position facing the magnet 875 in the axial direction so as to be able to detect a change in the magnetic field caused by rotation of the magnet 875.

On the cover-side surface 472, capacitors 128, 228, inductors 129, 229, and microcomputers forming the control units 170, 270 are mounted. In FIG. 3, reference numerals 170 and 270 are assigned to the microcomputers provided as the control units 170 and 270, respectively. The capacitors 128 and 228 smoothen electrical power input from the batteries 191 and 291 (see FIG. 4). The capacitors 128 and 228 assist electric power supply to the motor 80 by storing electric charge therein. The capacitors 128, 228 and inductors 129, 229 configure filter circuits, respectively, to reduce noises transmitted from other devices which share the batteries 191, 291, and also to reduce noises transmitted to the other devices, which share the batteries 191, 291, from the driving device 40. It is noted that, power supply relays, motor relays, current sensors, etc. (not shown in the figures) region also mounted on the motor-side surface 471 or on the cover-side surface 472.

Figure 4:
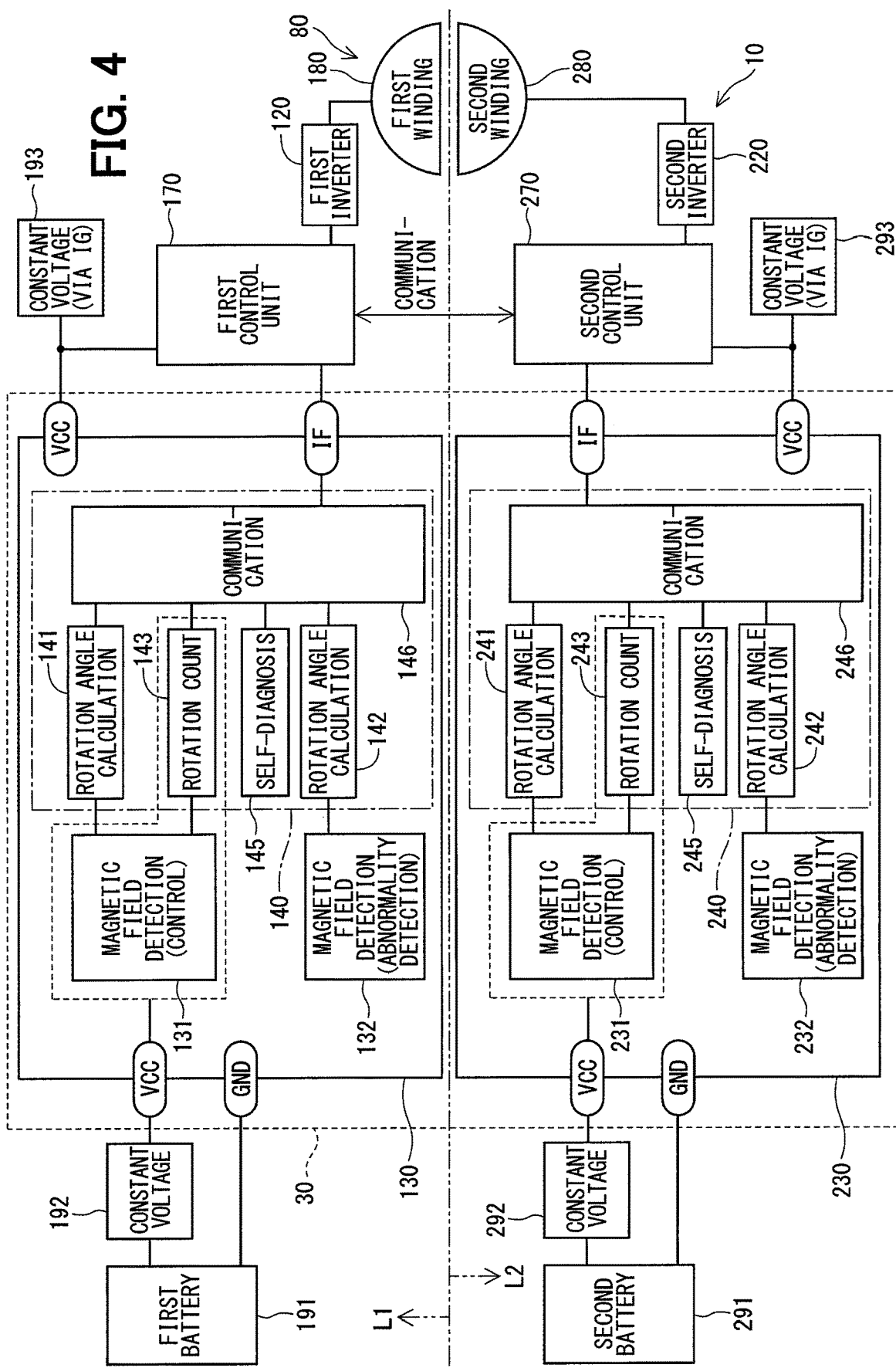
FIG. 4 is a block diagram showing an ECU according to the first embodiment.

As shown in FIG. 4, the ECU 10 includes the rotation angle sensor 30, the driver circuits 120, 220, the control units 170, 270 and the like. In FIG. 4, the driver circuit, which is generally an inverter, is labeled as "INV". The first driver circuit 120 is a three-phase inverter having six switching elements 121, and converts the electric power supplied to the first motor winding 180. The switching elements 121 are controlled to turn on and off based on control signals output from the first control unit 170. The second driver circuit 220 is a three-phase inverter having six switching elements 221, and converts the electric power supplied to the second motor winding 280. The switching elements 221 are controlled to turn on and off based on control signals output from the second control unit 270.

The rotation angle sensor 30 includes the first sensor unit 130 and the second sensor unit 230. The first sensor unit 130 outputs an output signal SGN1 to the first control unit 170, and the second sensor unit 230 outputs an output signal SGN2 to the second control unit 270. That is, in the present embodiment, the first sensor unit 130 is included in the first system L1, and the second sensor unit 230 is included in the second system L2.

The first sensor unit 130 includes magnetic field detection elements 131, 132 and a signal processing unit 140. The second sensor unit 230 includes magnetic field detection elements 231, 232 and a signal processing unit 240. For the same processing in the sensor units 130 and 230, the description of the second sensor unit 230 is generally simplified.

The magnetic field detection elements 131, 132, 231 and 232 are detection elements that detect changes in the magnetic field generated by the magnet 875 which are caused by the rotation of the motor 80. An MR sensor or a Hall IC, for example, is used for each of the magnetic field detection elements 131, 132, 231 and 232. The magnetic field detection elements 131, 132, 231 and 232 are four sensor elements that output cos+ signal, sin+ signal, cos− signal and sin− signal, respectively, as described later with reference to FIG. 10 and FIG. 11. Hereinafter, the cos+ signal, the sin+ signal, the cos− signal and the sin− signal are collectively referred to as the sensor signal.

The signal processing unit 140 includes rotation angle calculation units 141, 142, a rotation count unit 143, a self-diagnosis unit 145 and a communication unit 146. The signal processing unit 240 includes rotation angle calculation units 241, 242, a rotation count unit 243, a self-diagnosis unit 245 and a communication unit 246.

The rotation angle calculation unit 141 calculates a mechanical angle $\theta m1c$ based on the signal from the magnetic field detection element 131. The rotation angle calculation unit 142 calculates a mechanical angle $\theta m1e$ based on the signal from the magnetic field detection element 132. The rotation angle calculation unit 241 calculates a mechanical angle $\theta m2c$ based on the signal from the magnetic field detection element 231. The rotation angle calculation unit 242 calculates a mechanical angle $\theta m2e$ based on the signal from the magnetic field detection element 232. The mechanical angles $\theta m1c$, $\theta m1e$, $\theta m2c$ and $\theta m2e$ are calculated from arc tangent of the cos+ signal, the sin+ signal, the cos− signal and the sin− signal, respectively.

As described later, in case that the systems L1 and L2 have a phase difference, the phase difference correction is performed as needed so that the mechanical angles $\theta m1c$, $\theta m1e$, $\theta m2c$ and $\theta m2e$ are equal when the position of the rotor 860 is the same. Hereinafter, the mechanical angles $\theta m1c$, $\theta m1e$, $\theta m2c$ and $\theta m2e$ are values after phase difference correction. The phase difference correction may be performed in the control units 170 and 270.

In the present embodiment, the mechanical angles $\theta m1c$ and $\theta m2c$ calculated based on the detection signals of the magnetic field detection elements 131 and 231 are used for various calculations in the control units 170 and 270, and the mechanical angles $\theta m1e$ and $\theta m2e$ calculated based on the detection signals of the magnetic field detection elements 132 and 232 are used for abnormality detection performed by comparison with the mechanical angles $\theta m1c$ and $\theta m2c$. Hereinafter, the magnetic field detection elements 131 and 231 are referred to as being "for control," and the magnetic field detection elements 132 and 232 are referred to as being "for abnormality detection". Values calculated by the rotation angle calculation units 141, 142, 241 and 242 may be any values that can be converted into mechanical angles.

The magnetic field detection elements 131 and 231 for control and the magnetic field detection elements 132 and 232 for abnormality detection may be of the same type or of different types. Since detection accuracy is not required for abnormality detection as compared with that for control, detection accuracy may be lower for abnormality detection than that for control. Using different types of elements between for control and for abnormality detection is preferred from the viewpoint of function safety, because both elements for abnormality detection and for control rarely break down together, i.e., at the same time. It is to be noted that, not only a case that the type of the element itself is different but also a case that the same type element is differently laid out and/or has different detection circuits, or even a case that each element comes from different production lot may be considered as using the different type elements. Further, it may also be preferable, from the viewpoint of function safety, to design calculation circuits of the rotation angle calculation units 141 and 142 differently.

The rotation count unit 143 calculates a count value TC1 based on the signal from the magnetic field detection element 131. The rotation count unit 243 calculates a count value TC2 based on the signal from the magnetic field detection element 231.

Figure 6:
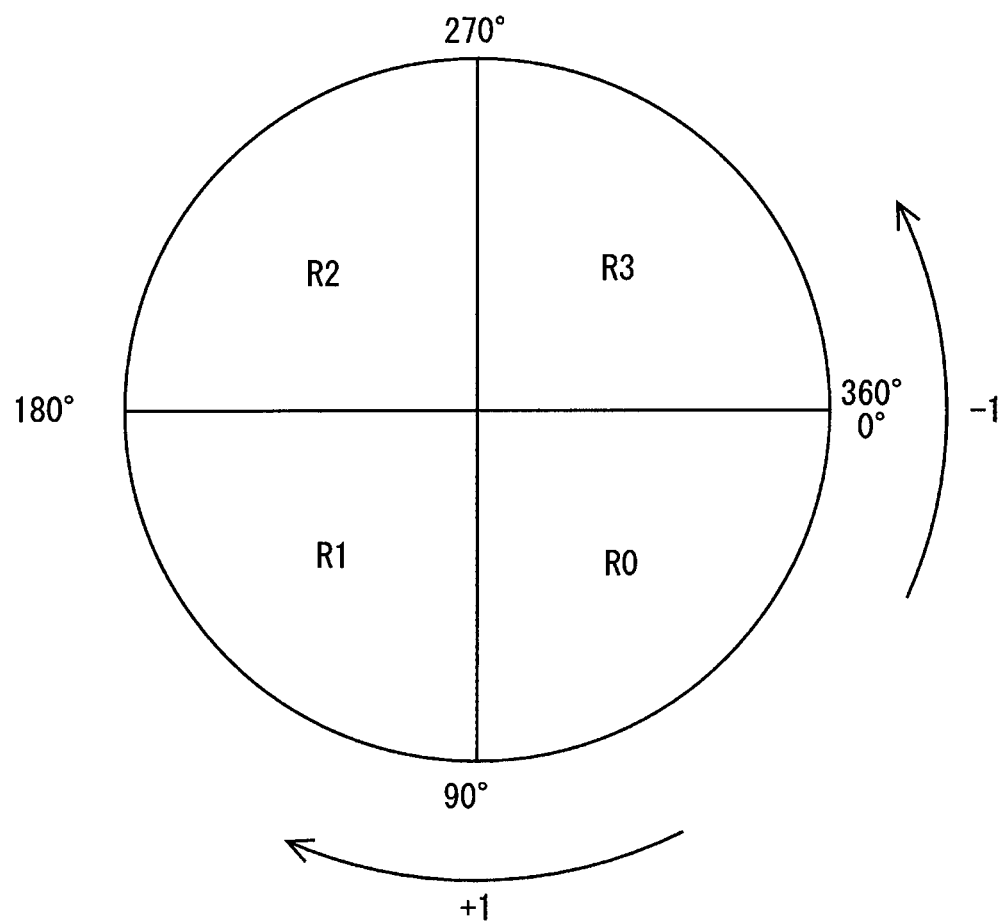
FIG. 6 is an explanatory diagram illustrating plural region of one rotation of a motor according to the first embodiment.

As shown in FIG. 6, during one rotation of the motor 80, the mechanical angle $\theta m$ changes from 0° to 360°, and four count regions are set by dividing 360° by 4. The position where the mechanical angle $\theta m$ switches from 360° to 0° is set as a rotation angle switching position. In the following figures such as FIG. 9A and FIG. 9B, the rotation angle switching position is indicated as 0° only without indication as 360°. In the present embodiment, a region of the mechanical angle $\theta m$ from 0° to 90° is referred to as a region R0, a region of the mechanical angle $\theta m$ from 90° to 180° is referred to as a region R1, a region of the mechanical angle $\theta m$ from 180° to 270° is referred to as a region R2, and a region of the mechanical angle $\theta m$ from 270° to 360° is referred to as a region R3. Each time the mechanical angle $\theta m$ changes from one region to the next region, the count values are counted up or down according to the direction of rotation. In the present embodiment, the count values are counted up (+1) when the motor 80 rotates in the forward direction, and counted down (−1) when the motor 80 rotates in the reverse direction. That is, count values TC1 and TC2 increase by 4 when the motor 80 makes one rotation in the forward direction, and the count values TC1 and TC2 decrease by 4 when the motor 80 makes one rotation in the reverse direction.

As shown in FIG. 4, the self-diagnosis unit 145 monitors an abnormality such as a short-circuit fault at a power supply source or a ground fault in the first sensor unit 130. The communication unit 146 generates the first output signal SGN1, which is a set of signals including the mechanical angles θm1c, θm1e, the count value TC1, a self-diagnosis result and the like, and transmits the first output signal SGN1 to the first control unit 170. The self-diagnosis unit 245 monitors an abnormality in the second sensor unit 230. The communication unit 246 generates the second output signal SGN2 which is a set of signals including the mechanical angles θm2c, θm2e, the count value TC2, a self-diagnosis result and the like, and transmits the second output signal SGN2 to the second control unit 270. The output signals of the present embodiment are digital signals, and a communication method is, for example, SPI communication, but other communication methods may alternatively be used.

The count value TC1 included in the first output signal SGN1 may be a value determined by adding an offset value a for making the mechanical angle θm1 and an initial value of the count value TC1 coincide. It may alternatively be determined by adding or subtracting 1 for correction of uncounted or over-counted values. The count value TC2 included in the second output signal SGN2 is determined in the similar way.

A constant voltage is supplied to the first sensor unit 130 from the first battery 191 via constant voltage sources 192 and 193 which are voltage regulators or the like. The constant voltage is continuously supplied via the constant voltage source 192 to the magnetic field detection element 131 and the rotation count unit 143 which are surrounded by broken lines in FIG. 4 even while a start switch of the vehicle such as an ignition switch or the like is in the off-state. Thus, it is possible to continue detection and calculation with the continuous power supply. In the first sensor unit 130, components other than the magnetic field detection element 131 and the rotation count unit 143 are supplied with electric power via a constant voltage source 193 when the start switch is in the on-state. The constant voltage supply is stopped when the start switch is turned off. Constant voltage is supplied to the first control unit 170 via the constant voltage source 193 when the start switch is in the on-state.

A constant voltage is supplied to the second sensor unit 230 from the second battery 291 via constant voltage sources 292 and 293 which are voltage regulators or the like. The magnetic field detection element 231 and the rotation count unit 243 surrounded by broken lines are continuously supplied with the constant voltage via the constant voltage source 292 even while the start switch is in the off-state. It is thus possible to continue detection and calculation with the continuous power supply. In the second sensor unit 230, components other than the magnetic field detection element 231 and the rotation count unit 243 are supplied with the constant voltage via the constant voltage source 293 when the start switch is in the on-state. The power supply is stopped when the start switch is turned off. The constant voltage is supplied to the second control unit 270 via the constant voltage source 293 when the start switch is in the on-state.

It is desirable to select elements of low power consumption, such as a TMR element, for example, for the magnetic field detection elements 131 and 231 to which the electric power is continuously supplied. In order to avoid complication, descriptions of some wires and control lines such as a connection line between the battery 191 and the constant voltage source 193 are omitted. The same as above applies to FIG. 5 and the like.

In addition, the rotation count units 143 and 243 may calculate the count values TC1 and TC2 based on the signals of the magnetic field detection elements 132 and 232 in place of the magnetic field detection elements 131 and 231. In this case, the constant voltage is continuously supplied to the magnetic field detection elements 132 and 232.

Each of the first and second control units 170 and 270 is mainly composed of a microcomputer and the like, and internally includes, although not shown in the figure, a CPU, a ROM, a RAM, an I/O, a bus line for connecting these components, and the like. Processing executed by each of the control units 170 and 270 may be software processing or may be hardware processing. The software processing may be implemented by causing the CPU to execute a program. The program may be stored beforehand in a memory device such as a ROM, that is, in a computer readable, non-transitory, tangible storage medium. The hardware processing may be implemented by a special purpose electronic circuit.

The first control unit 170 and the second control unit 270 are provided to be communicable with each other. Hereinafter, the communication between the control units 170 and 270 may be referred to as inter-computer communication. As a communication method between the control units 170 and 270, any method such as serial communication like SPI or SENT, CAN communication, FlexRay communication or the like may be employed.

The first control unit 170 is configured to generate a first control signal for controlling turning on and off of the switching elements 121 of the driver circuit 120 for current feedback control or the like, for example, based on the mechanical angle θm1c, the detection value of a current sensor (not illustrated) and the like. The second control unit 270 is configured to generate a second control signal for controlling turning on and off of the switching elements 221 of the driver circuit 220 for current feedback control or the like, for example, based on the mechanical angle θm2c, the detection value of a current sensor (not illustrated) and the like. It is noted that the mechanical angles θm1c and θm2c are converted to electrical angles as required in case the mechanical angles are used for the current feedback control or the like.

Figure 5:
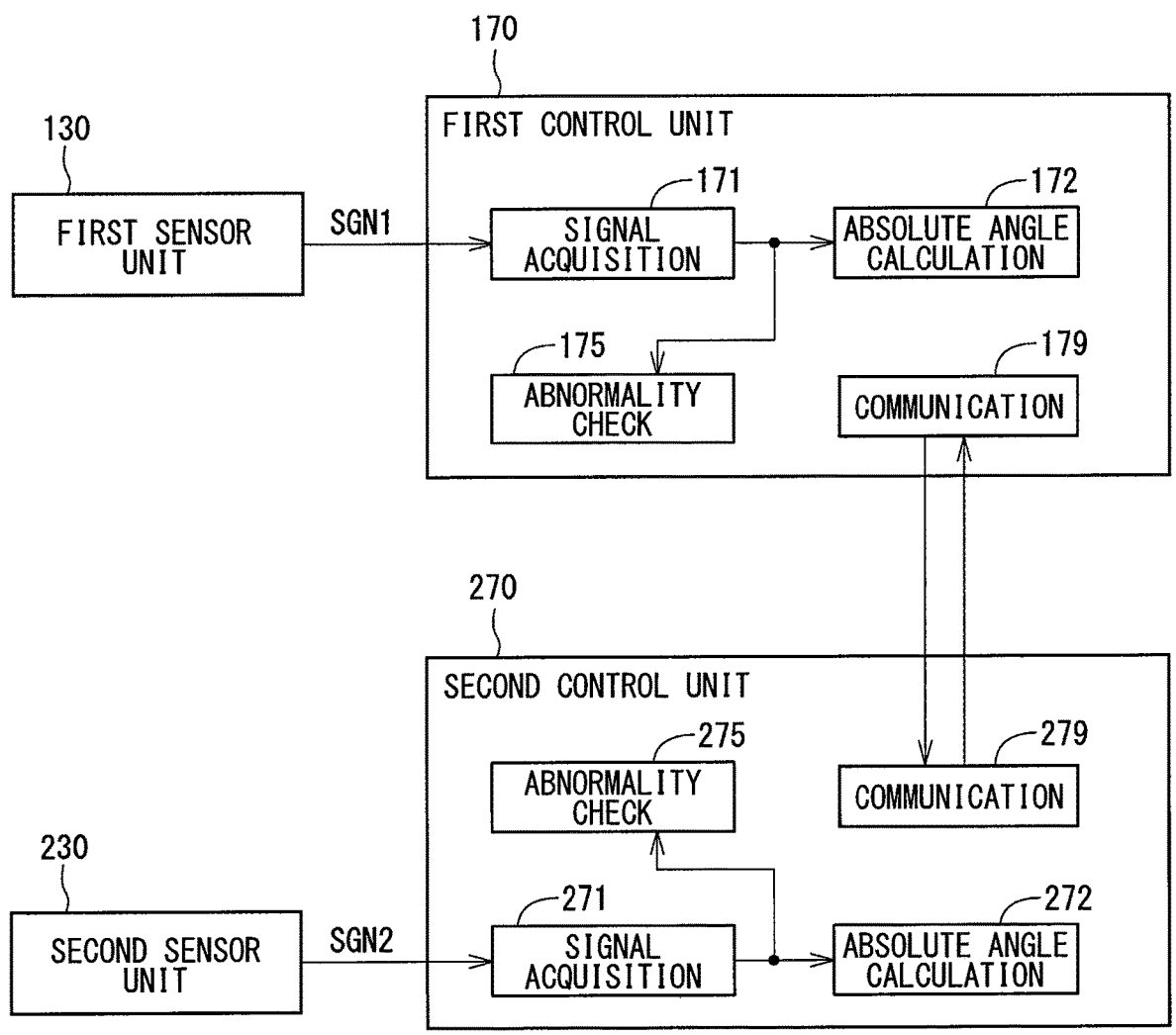
FIG. 5 is a block diagram showing a control unit in the first embodiment.

As shown in FIG. 5, the first control unit 170 is configured to include a signal acquisition unit 171, an absolute angle calculation unit 172, an abnormality check unit 175 and a communication unit 179. The second control unit 270 is configured to include a signal acquisition unit 271, an absolute angle calculation unit 272, an abnormality check unit 275 and a communication unit 279. These units 171, 172, 175, 179 271, 271, 275 and 279 indicate functions which the microcomputer performs by execution of the programmed processing.

The signal acquisition unit 171 is configured to acquire the first output signal SGN1 from the first sensor unit 130. The signal acquisition unit 271 is configured to acquire the second output signal SGN2 from the second sensor unit 230. The absolute angle calculation unit 172 is configured to calculate the absolute angle θa1 using the mechanical angle θm1c and the count value TC1. The absolute angle calculation unit 272 is configured to calculate the absolute angle θa2 using the mechanical angle θm2c and the count value TC2. The absolute angles θa1 and θa2 are rotation amounts indicating angular intervals from the reference position. The absolute angles θa1 and θa2 are convertible to a steering angle θs, which is the rotation angle of the steering shaft 92, by using a gear ratio of the reduction gear 89. Further, the absolute angles θa1 and θa2 may be used for calculation other than the steering angle calculation or the like. The communication units 179 and 279 are configured to be capable of transmitting and receiving various information.

The abnormality check unit 175 is configured to check for abnormality of the first system L1 based on comparison results of the mechanical angles θm1c, θm1e and the self-diagnosis result acquired from the first sensor unit 130. When an abnormality is determined, the calculation of the absolute angle θa1 is stopped. The abnormality check unit 275 is configured to check for abnormality of the second system L2 based on comparison results of the mechanical angles θm2c, θm2e and the self-diagnosis result acquired from the second sensor unit 230. When an abnormality is determined, the calculation of the absolute angle θa2 is stopped. Hereinafter, it is assumed that the first system L1 and the second system L2 are both normal.

Hereinafter, the absolute angle calculation using the mechanical angle and the count value will be described with respect to the calculation in the first system L1 as an example. In the description of the same calculation in each of the plural systems, the suffixes "1," "2" and the like indicating the respective systems are omitted. In addition, as described above, the mechanical angles θm1c and θm2c for control are used for various calculations. In the description of various calculations, the subscript "c" indicating distinction between "for control" and "for abnormality detection" is omitted hereafter. The same is applicable to other embodiments described later.

Figure 7:
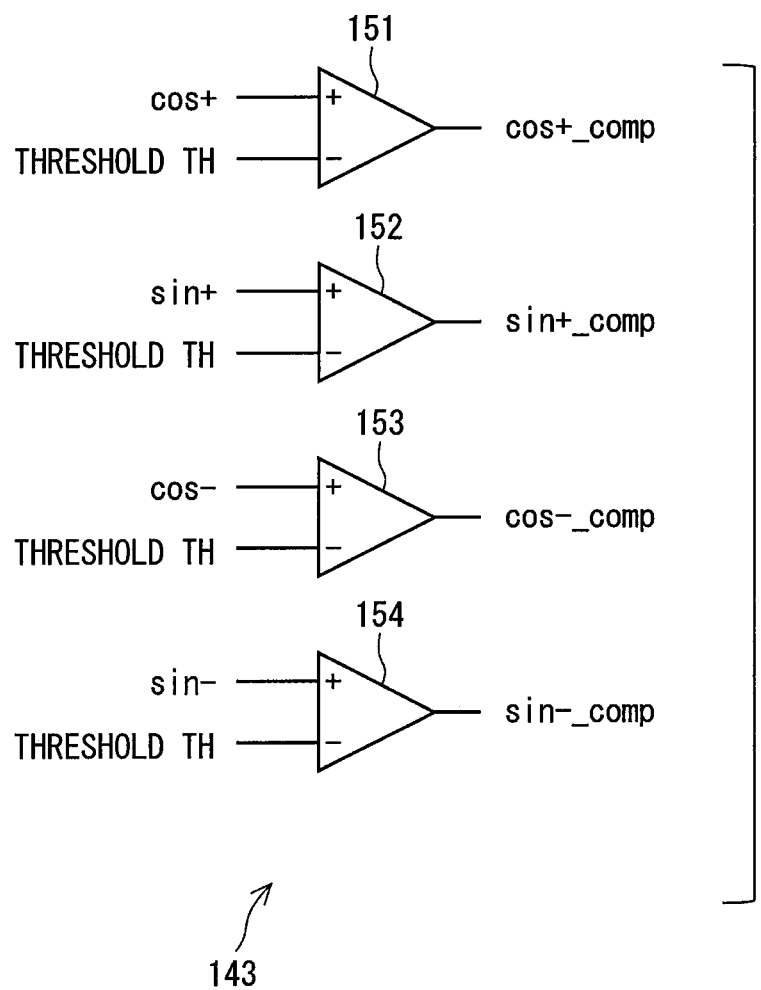
FIG. 7 is a circuit diagram showing a rotation count unit according to the first embodiment.

As shown in FIG. 7, the rotation count unit 143 has comparators 151 to 154. The cos+ signal and a threshold value TH are input to a non-inverting terminal and an inverting terminal of the comparator 151, respectively. When the cos+ signal is larger than the threshold value TH, a cos+ comparison signal of high level Hi is output. When the cos+ signal is smaller than the threshold value TH, a cos+ comparison signal of low level Lo is output. The sin+ signal and a threshold value TH are input to a non-inverting terminal and an inverting terminal of the comparator 152, respectively. When the sin+ signal is larger than the threshold value TH, a sin+ comparison signal of high level Hi is output. When the sin+ signal is smaller than the threshold value TH, a sin+ comparison signal of low level Lo is output. The cos− signal and a threshold value TH are input to a non-inverting terminal and an inverting terminal of the comparator 153, respectively. When the cos− signal is larger than the threshold value TH, a cos− comparison signal of high level Hi is output. When the cos− signal is smaller than the threshold value TH, a cos− comparison signal of low level Lo is output. The sin− signal and a threshold value TH are input to a non-inverting terminal and an inverting terminal of the comparator 154, respectively. When the sin− signal is larger than the threshold value TH, a sin− comparison signal of high level Hi is output. When the sin− signal is smaller than the threshold value TH, a sin− comparison signal of low level Lo is output. The threshold values TH may be arbitrarily set. The count value TC1 may also be calculated by any method other than (i) output signal comparison of the cos+ signal, sin+ signal, cos− signal and sin− signal and (ii) threshold comparison by logical operation using each of those signals. In the present embodiment, when the comparison signal of the comparators 151 to 154 falls, the count value TC1 is counted up if the rotation direction of the motor 80 is the forward direction, and counted down if it is the reverse direction. The rotational direction is determined separately.

In the figure, the cos+ comparison signal is indicated as cos+_comp, the sin+ comparison signal as sin+_comp, the cos− comparison signal as cos−_comp and the sin−_comparison signal as sin−_comp. The rotation count part 243 is configured similarly, and hence illustration of its comparators is omitted.

Figure 8:
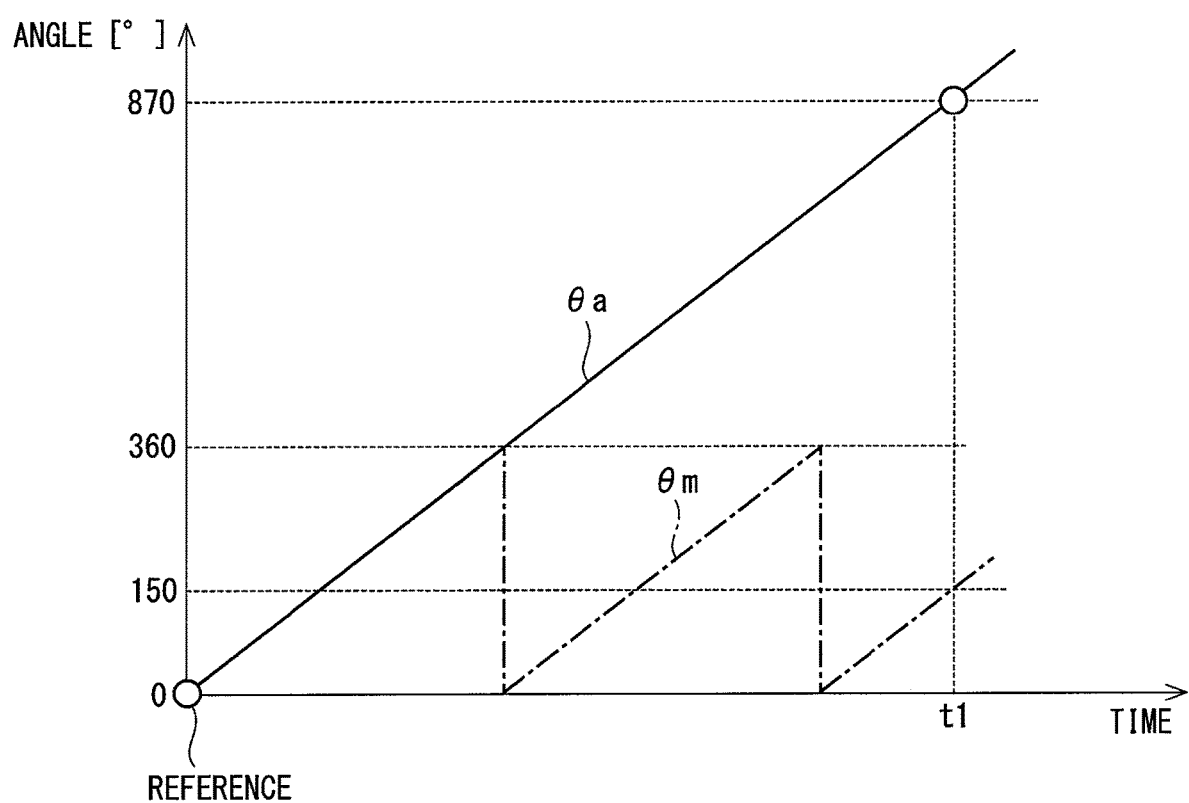
FIG. 8 is a time chart showing a mechanical angle and an absolute angle according to the first embodiment.

The absolute angle θa is described hereafter. In the present embodiment, the absolute angle θa is defined to be an angular interval, by which the motor 80 is rotated from a predetermined certain point (i.e., reference position) by using the count value TC and the mechanical angle θm. For example, it is assumed in FIG. 8 that the motor 80 rotates 870° at time t1 from the reference position 0°. In this example, the motor makes two rotations (720°) plus the mechanical angle θm of 150°. The reference position may be other than 0°. The absolute angle θa can be calculated by the following equation (1) or (2). Here, specifically, an example of calculation with TC=9 and θm=150 is shown.

$$\theta a = TC \times 90 + \mathrm{MOD}(\theta m, 90) \quad (1)$$
$$= 9 \times 90 + 60 = 870 \ [°]$$

In the equation (1), MOD(θm, 90) means a remainder as a result of dividing the mechanical angle θm by 90. According to the equation (1), it is determined from the count value TC how many rotations the motor 80 has completed and in which region the motor is at present, and from the mechanical angle θm at which position the motor is rotated.

$$\theta a = \mathrm{INT}(TC/4) \times 360 + \theta m \quad (2)$$
$$= 2 \times 360 + 150 = 870 \ [°]$$

INT(TC/4) in the equation (2) means a quotient determined as a result of dividing the count value TC by 4. In the equation (2), it is determined how many times the motor 80 has rotated based on the count value TC, and then it is further determined where the rotation position of the motor 80 actually is based on the mechanical angle θm with reference to the reference position. As described above, the calculation results of the equations (1) and (2) are the same. That is, either of the two calculations (1) and (2) is usable.

There may be a possibility that a count timing of the count value TC may be deviated from normal count timing due to a deviation of the threshold value TH or an error of the sensor signal. In the present embodiment, therefore, an angular region in which the count value TC may be counted up or counted down is designated to be an indefinite region Ri. The indefinite region Ri is a region where the count value TC may be deviated from a true value depending on whether or not the count value TC has already been counted up or down. Further, a region, in which the count value TC will not be counted up or counted down and the count value TC is stably determinable, is defined to be a definite region Rd. The definite region Rd and the indefinite region Ri are determined according to the threshold value, the detection error and the like. In the present embodiment, a region from the detection of the falling (from Hi to Lo) of the comparison signals of the comparators 151 to 154 to the detection of the next rising (from Lo to Hi) is defined as the indefinite region Ri. The definite region Rd and the indefinite region Ri are thus understood to be a stable region and an unstable region, respectively, and will be described in more detail later with reference to FIG. 9A and FIG. 9B.

The count value TC that can be taken in case of the correct count value TC=x of the region R0 (0° to 90° in FIG. 6) below. When the motor 80 is rotating in the forward direction, the count value Tc may possibly take x+1 if it is counted up in the indefinite region. In addition, when the motor 80 is rotating in the reverse direction, the count value Tc may possibly take x−1 if it is counted down in the indefinite region. That is, three count values TC of x±1 may possibly be taken in the region R0. The same applies to other regions R1, R2 and R3 shown in FIG. 6.

Further, when shifting from the region R3 to the region R0, it is necessary to consider whether the count value TC has already finished counting or not and whether the region has crossed 0° (reference position). For example, in case the absolute angle θa is calculated by the equation (2), there is a possibility that the absolute angle θa may be deviated by 360° with respect to the true value. As a specific example, it is assumed that the mechanical angle is θm=340°, the count value is TC=3 in the region R3, the count value is TC=4 in the region R0 to be subsequently shifted. Under this assumption, the absolute angle θa is calculated by the following equation (3) in case that the count value TC has not been counted in the indefinite region R3, and the absolute angle θa is calculated by the following equation (4) in case that the count value TC has been counted in the indefinite region R3.

$$\theta a = \text{INT}(3/4) \times 360 + 340 = 340 \quad (3)$$

$$\theta a = \text{INT}(4/4) \times 360 + 340 = 700 \quad (4)$$

Figure 9A:
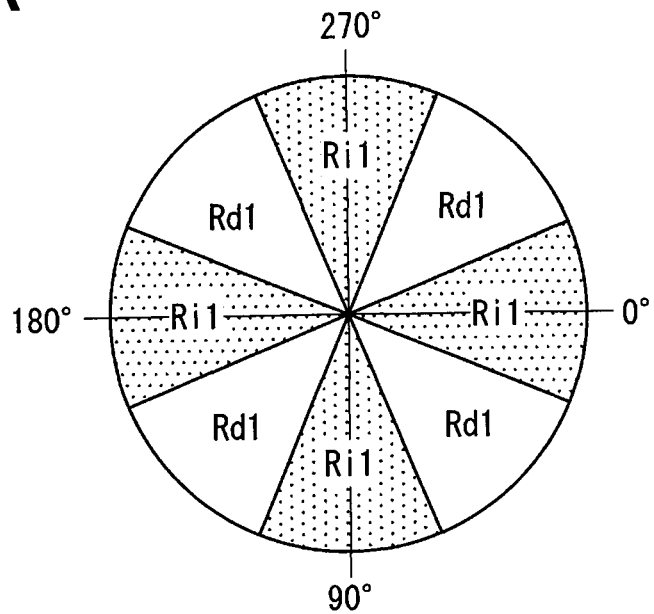
FIG. 9A and FIG. 9B are explanatory diagrams of definite regions and indefinite regions according to the first embodiment.
Figure 9B:
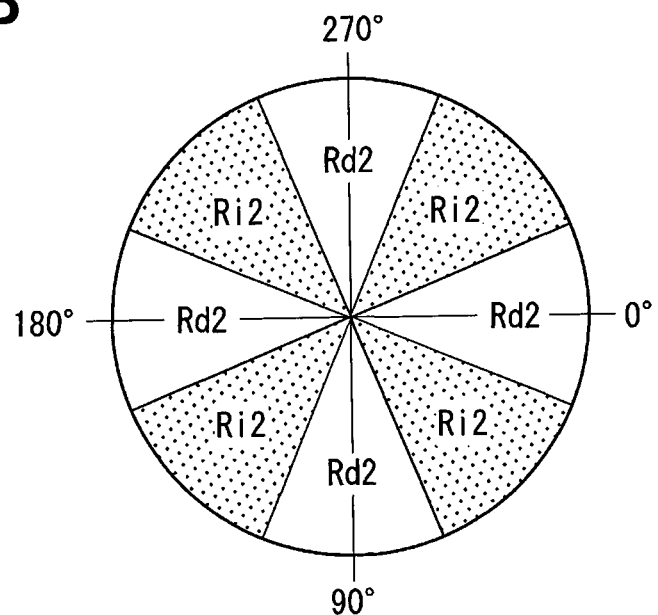

Therefore, in the present embodiment, a detection phase is shifted so that the two indefinite regions Ri do not overlap. FIG. 9A shows the stable and indefinite regions of the first system L1, and FIG. 9B shows the stable and indefinite regions of the second system L2. Here, it is assumed the definite region of the first system L1 is Rd1, the indefinite region of the first system L1 is Ri, the definite region of the second system L2 is Rd2, and the indefinite region of the second system L2 is Ri2. In the present embodiment, it is assumed that phase difference correction is performed in the second sensor unit 230 to match the phase of the first sensor unit 130. For the second system L2, the region corresponding to the mechanical angle θm2 after phase difference correction is indicated.

In case that the definite regions Rd1 and Rd2 are larger than the indefinite regions Ri1 and Ri2, the detection phase is shifted by an angle determined by dividing 360° by two times of a division number so that the indefinite regions Ri1 and Ri2 do not overlap. Since the number of division is 4 in the present embodiment, the detection phase is shifted by 45° so that the indefinite regions Ri1 and Ri2 do not overlap. Thus, the absolute angle θa can be appropriately calculated by using the value of the system which is in the definite regions Rd1 and Rd2. If the indefinite regions Ri1 and Ri2 are smaller than 45°, the phases may be shifted in an arbitrary range in which the indefinite regions Ri1 and Ri2 do not overlap.

Figure 10:
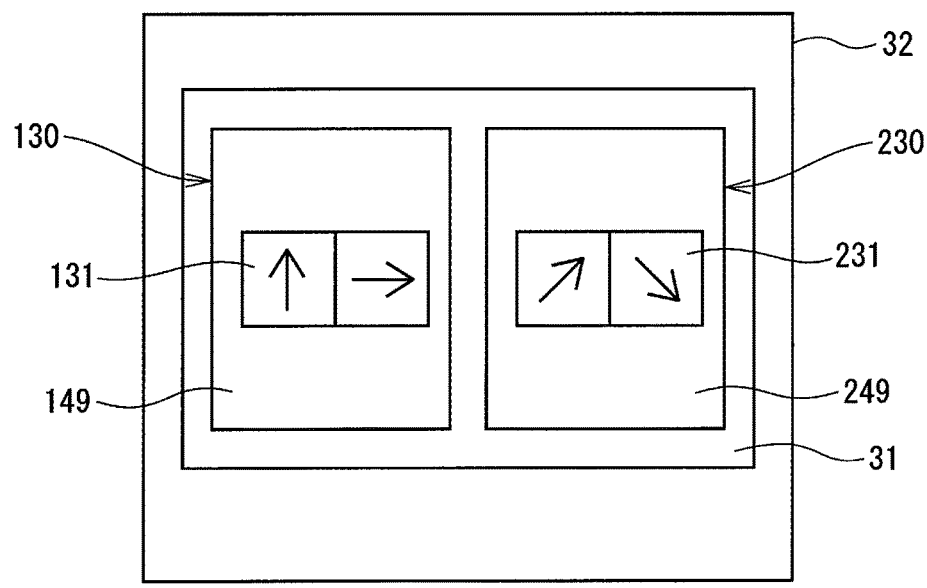
FIG. 10 is a schematic view showing one example of a rotation angle sensor according to the first embodiment.
Figure 11:
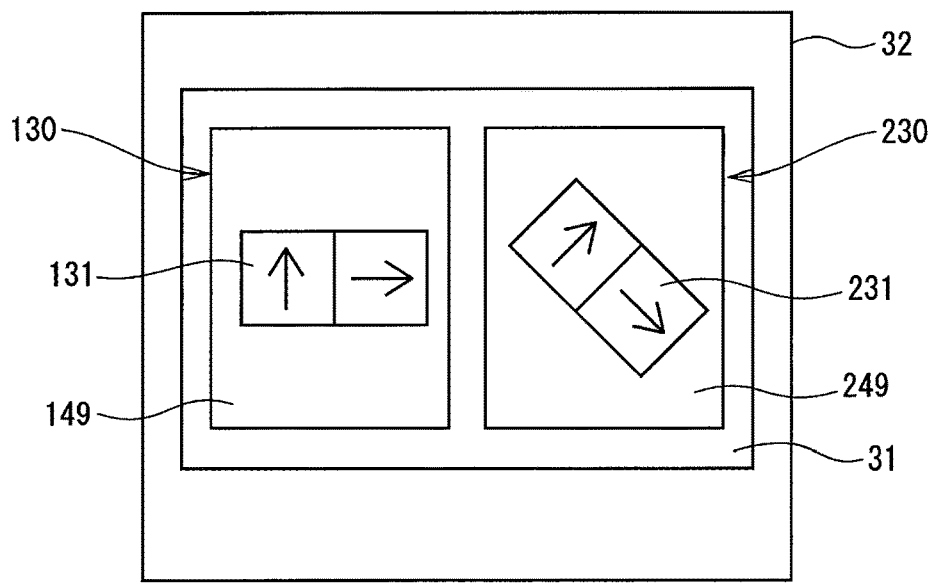
FIG. 11 is a schematic view showing another example of a rotation angle sensor according to the first embodiment.
Figure 15:
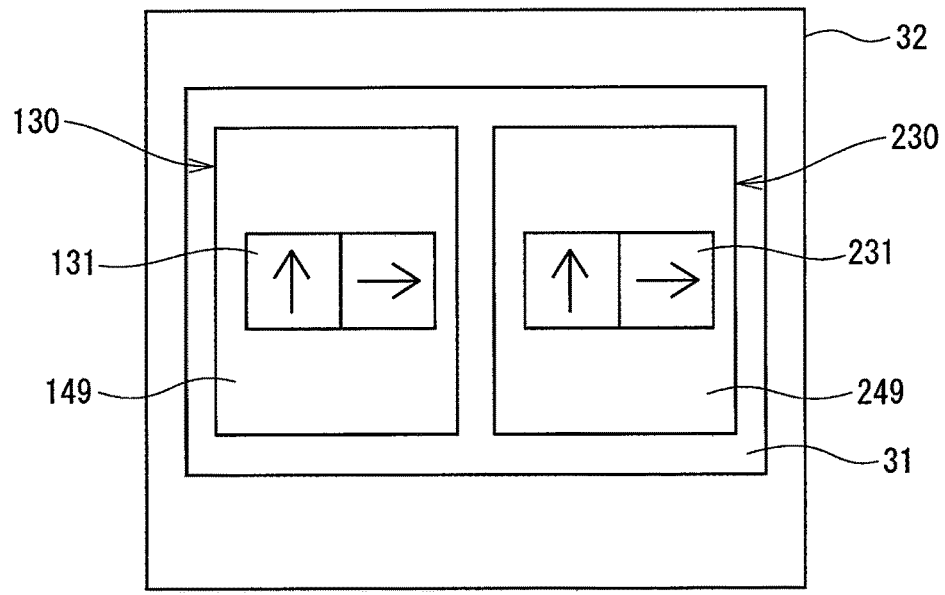
FIG. 15 is a schematic view showing a rotation angle sensor according to a second embodiment.

The configuration of the rotation angle sensor 30 is shown in FIG. 10 and FIG. 11. In FIG. 10, FIG. 11 and FIG. 15, the magnetic field detection units 132 and 232 for abnormality detection are not shown for simplicity. As shown in FIG. 10, in the rotation angle sensor 30, arithmetic calculation circuits 149 and 249 constituting the signal processing unit 140, and the magnetic field detection elements 131, 132, 231, 232 are mounted on a lead frame 31. In the present embodiment, the arithmetic calculation circuits 149 and 249 are mounted on the lead frame 31, and the magnetic field detection elements 131, 132, 231, 232 are mounted on the arithmetic calculation circuits 149 and 249. However, the magnetic field detection elements 131, 132, 231, 232 may be directly mounted on the lead frame 31. The lead frame 31, the arithmetic calculation circuits 149, 249 and the magnetic field detection elements 131, 132, 231, 232 are sealed in a package 32 made of, for example, resin.

In FIG. 10 and FIG. 11, the detection directions of the +sin signal and the +cos signal of the magnetic field detection elements 131 and 231 are indicated by arrows. The output is maximized when the magnetic flux direction of the magnet 875 matches the direction of the arrows. This also applies to FIG. 18. In FIG. 10, the detection elements are configured differently between the first sensor unit 130 and the second sensor unit 230 so that the detection directions of the magnetic field detection elements 131 and 231 are shifted by 45°. Further, as shown in FIG. 11, the detection direction may be shifted by arranging them to incline by 45° while the elements themselves are configured the same.

Figure 12:
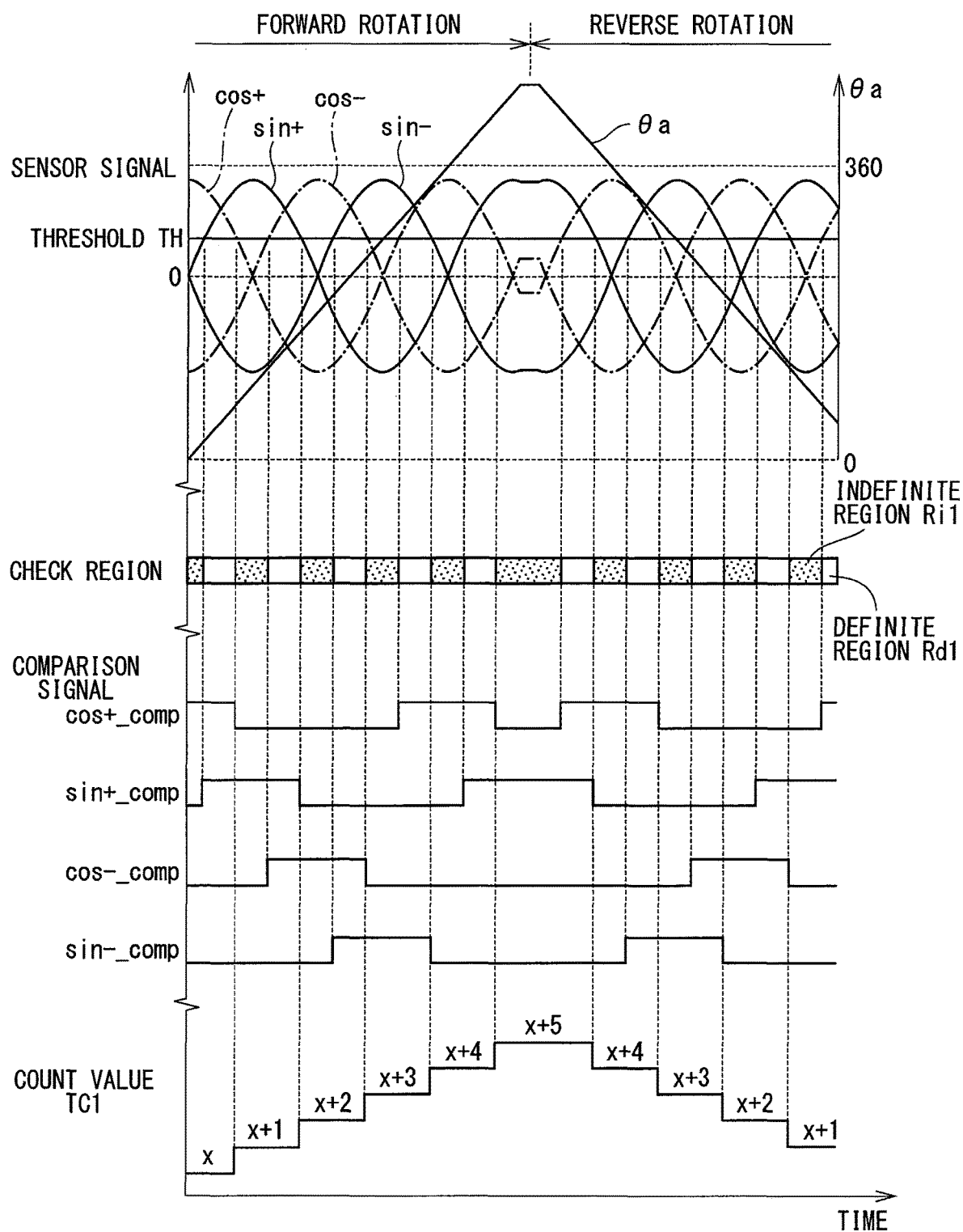
FIG. 12 is a time chart showing a sensor signal, an absolute angle, a check region, a comparison signal and a count value in a first system according to the first embodiment.
Figure 13:
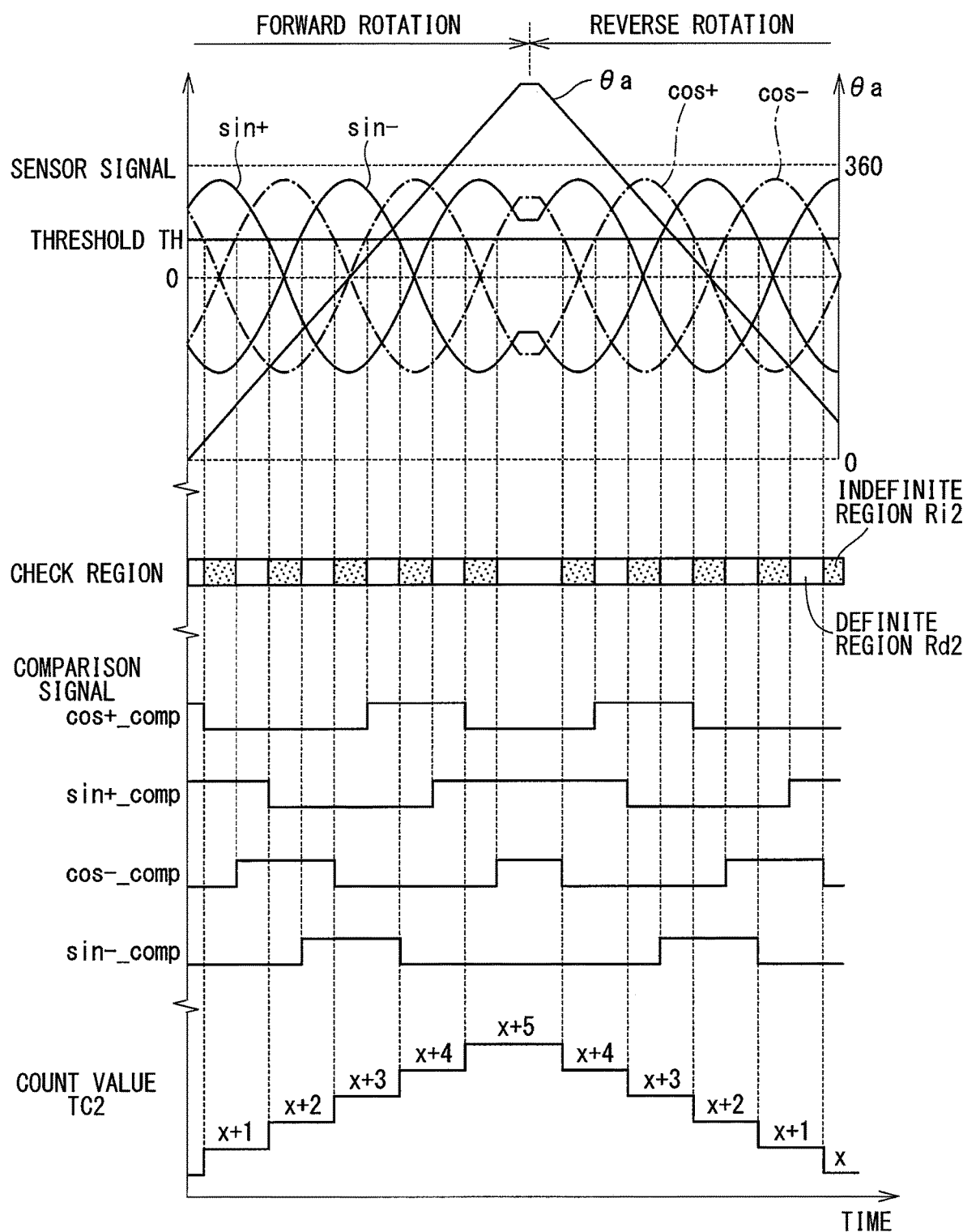
FIG. 13 is a time chart showing a sensor signal, an absolute angle, a check region, a comparison signal and a count value in a second system according to the first embodiment.

In FIG. 12 and FIG. 13, the sensor signal and the absolute angle θa, the check region, the comparison signal and the count value TC are shown from the top to the bottom. FIG. 12 shows the values of the first system L1, and FIG. 13 shows the values of the second system L2. As shown in FIG. 12 and FIG. 13, by shifting the phase of the sensor signal by 45° between the first system L1 and the second system L2, the indefinite regions Ri1 and Ri2 do not overlap. In this embodiment, the method of calculating the count values TC1 and TC2 is the same. Each falling edge at the timing at which the number of the Hi signal is only one is counted based on the comparison signal, which is a comparator signal according to the comparison result of the sensor signal with the threshold value TH.

Figure 14:
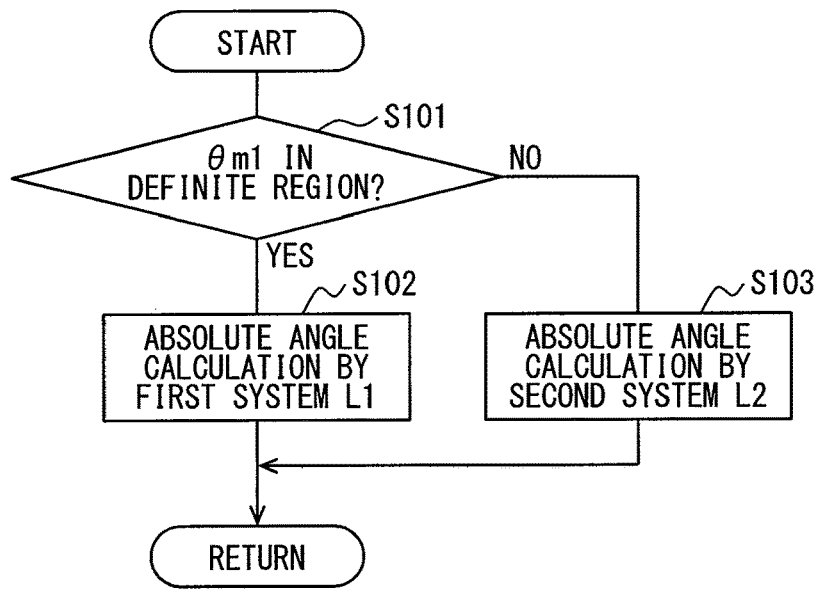
FIG. 14 is a flowchart showing absolute angle calculation processing according to the first embodiment.

The absolute angle calculation processing in the present embodiment will be described with reference to a flowchart of FIG. 14. This processing is executed by the control units 170 and 270 at a predetermined cycle. Here, it is assumed that the mechanical angles θm1 and θm2 are shared by inter-microcomputer communication. Hereinafter, "step" of step S101 is simply indicated as a symbol "S."

In S101, the control units 170 and 270 check whether the mechanical angle θm1 of the first system L1 is in the definite region Rd1. In case it is determined that the mechanical angle θm1 is in the definite region Rd1 (S101: YES), the processing proceeds to S102. In case it is determined that the mechanical angle θm1 is not in the definite region Rd1 (S101: NO), the processing proceeds to S103.

In S102, since the first system L1 is in the definite region, the absolute angle θa is calculated in the first system L1. Here, the first control unit 170 may share the absolute angle θa calculated using the value acquired from the first sensor unit 130 among the plural systems. The control units 170 and 270 may share the count value TC1 and mechanical angle θm1 of the first system L1, and the control units 170 and 270 may calculate the absolute angle θa using the count value TC1 and the mechanical angle θm1.

In S103, since the second system L2 is in the definite region, the absolute angle θa is calculated in the second system L2. Here, the second control unit 270 may share the absolute angle θa calculated using the value acquired from the second sensor unit 230 among the plural systems. Further, the control units 170 and 270 may share the count value TC2 and the mechanical angle θm2 of the second system L2, and the control units 170 and 270 may calculate the absolute angle θa using the count value TC2 and the mechanical angle θm2.

In the present embodiment, at least one of the systems L1 and L2 is made to be in the definite region by shifting the detection phase so that the indefinite regions Ri1 and Rig do not overlap between the first and second systems L1 and L2. Thus, by performing the absolute angle calculation using the value of the system in the definite region, the absolute angle θa can be calculated appropriately.

As described above, the ECU 10 includes plural sensor units 130, 230 and plural control units 170, 270. The sensor units 130 and 230 have at least one magnetic field detection element 131, 132 and 231, 232 for detecting the rotation of the motor 80, respectively, and output the mechanical angles θm1 and θm2 related to the rotation angle during one rotation and the count values TC1 and TC2 related to the number of rotations of the motor 80, respectively.

The control units 170 and 270 have the signal acquisition units 171 and 271 and absolute angle calculation units 172 and 272, respectively. The signal acquisition units 171 and 271 acquire the mechanical angles θm1 and θm2 and the count values TC1 and TC2 from the sensor units 130 and 230, respectively. The absolute angle calculation units 172 and 272 calculate the absolute angles θa1 and θa2, which are the rotation amounts from the reference position, based on the mechanical angles θm1 and θm2 and the count values TC1 and TC2, respectively.

One rotation of the motor 80 is divided into the indefinite regions Ri1 and Ri2, in which detection deviation of the count values TC1 and TC2 may occur, and the definite regions Rd1 and Rd2, in which no detection deviation occurs. The definite region Rd1 of at least one count value TC1 is set to be shifted from the definite region Rd2 of the other count value TC2. The absolute angle calculation units 172 and 272 calculate the absolute angle θa according to the rotational position of the motor 80 by using the count values TC1 and TC2 of the definite regions Rd1 and Rd2, respectively.

In the present embodiment, the absolute angle θa can be appropriately calculated by providing the sensor units 130 and 230 so that the definite regions Rd1 and Rd2 are shifted and by using the count values TC1 and TC2 in the definite regions Rd1 and Rd2, respectively. In particular, the absolute angles θa1 and θa2 can be calculated appropriately regardless of the rotation position of the motor 80 by setting the indefinite regions Ri1 and Ri2 not to overlap and making the count values TC1 and TC2 from at least one sensor unit 130 and 230 become values in the definite regions Rd1 and Rd2.

The magnetic field detection elements 131, 132, 231 and 232 detect changes in the magnetic field of the magnet 875. In the present embodiment, the magnetic field detection elements 131, 132, 231 and 232 are detection elements, and the magnet 875 is a detection target. The magnetic field detection element 131 is positioned so that the detection phase is different from that of the magnetic field detection element 231 provided in another sensor unit. Here, shifting the magnetization direction of the magnetic field detection elements 131 and 231 (see FIG. 10) and shifting the detection direction by shifting the mounting direction of the elements (see FIG. 11) both correspond to positioning the magnetic field detection to shift the detection phase. As a result, the definite regions Rd1 and Rd2 can be appropriately shifted.

In the present embodiment, the ECU 10 is a rotation detection device. The mechanical angles θm1 and θm2 are the rotation angles and the first rotation information. The second rotation information is the count values TC1 and TC2 which indicate the number of switching of the count regions counted up or down in correspondence to the rotation direction by dividing one rotation of the motor 80 into plural count regions.

The electric power steering apparatus 8 includes the ECU 10 and the motor 80 which outputs the torque required for a steering operation of the vehicle. That is, the ECU 10 is applied to the electric power steering apparatus 8. The control units 170 and 270 can calculate, by using the absolute angles θa1 and θa2, at least one of the steering angle that is the rotation angle of the steering shaft 92 and the tire angle that is the angle of the wheels 98. The tire angle may be a value equivalent to the tire angle by which the tire angle can be calculated. Since the ECU 10 of the present embodiment calculates the absolute angles θa1 and θa2, the ECU 10 can also calculate the steering angle by converting the absolute angles θa1 and θa2 with the gear ratio of the reduction gear 89 that transmits output of the motor 80 to the steering system 90. Thus, no steering angle sensor need be provided.

Second Embodiment

Figure 16:
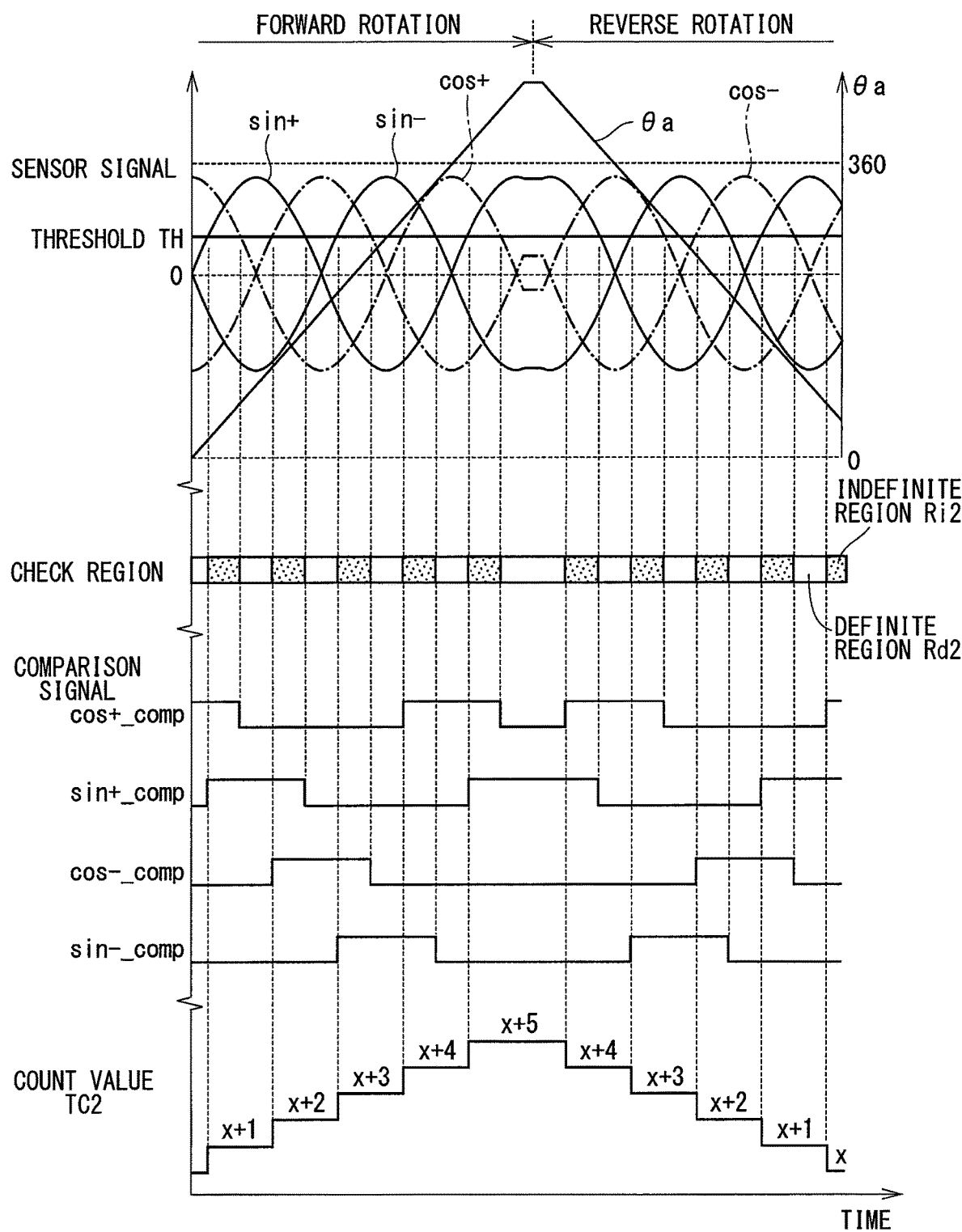
FIG. 16 is a time chart showing a sensor signal, an absolute angle, a check region, a comparison signal and a count value in a second system according to the second embodiment.

A second embodiment is shown in FIG. 15 and FIG. 16. As shown in FIG. 15, in the present embodiment, the detection directions of the magnetic field detection elements 131 and 231 coincide with each other. The sensor signals and the like of the first system L1 are the same as described in FIG. 12. The sensor signals and the like of the second system L2 are shown in FIG. 16. As shown in FIG. 12, FIG. 15 and FIG. 16, the sensor signals in the systems L1 and L2 are the same. The indefinite regions Ri1 and Rig are set not to overlap by making the counting configuration in the rotation count units 143 and 243 different.

The counting configuration of the first system L1 is the same as that of the first embodiment, and the counting is performed at the timing when the comparison signal falls and the number of the Hi signal is only one (see FIG. 12). On the other hand, as shown in FIG. 16, in the second system L2, counting is performed at the timing when the comparison signal rises and the number of the Hi signal is two. Thereby, the phases of the indefinite regions Ri1 and Ri2 are shifted, and the indefinite regions Ri1 and Ri2 are made not to overlap. The absolute angle calculation processing is the same as that of the first embodiment.

In the present embodiment, the magnetic field detection elements 131, 132, 231, 232 detect changes in the magnetic field of the magnet 875. The sensor units 130 and 230 include the rotation count units 143 and 243 that are arithmetic calculation circuits for calculating the count values TC1 and TC2. In the plural sensor units 130 and 230, the detection phases of the magnetic field detection elements 131, 132, 231 and 232 are the same. Further, the rotation count units 143 and 243 are made different for each of the sensor units 130 and 230 so that the definite regions Rd1 and Rd2 are shifted. In the present embodiment, the rotation count units 143 and 243 count edges of the comparison signals according to the comparison results of the sensor signals with the threshold values TH. The rotation count unit of one sensor unit counts the falling edge, and the rotation count unit of the other sensor unit counts the rising edge of the comparison signal. The definite regions Rd1 and Rd2 are appropriately shifted by making the rotation count units 143 and 243 different and shifting the counting phase. The present embodiment also provides the same advantages as those of the first embodiments.

Third Embodiment

Figure 17:
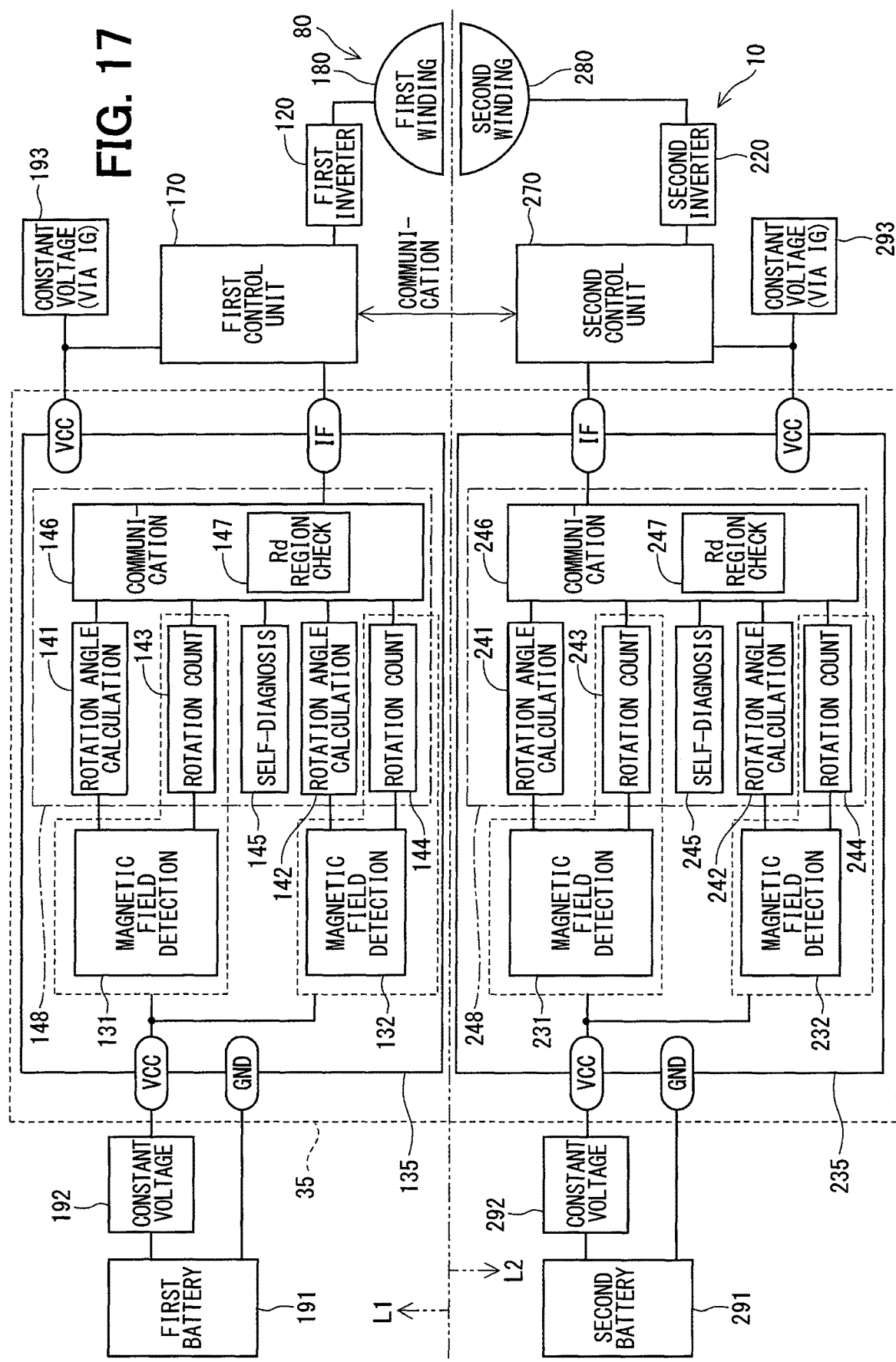
FIG. 17 is a block diagram showing an ECU according to a third embodiment.
Figure 18:
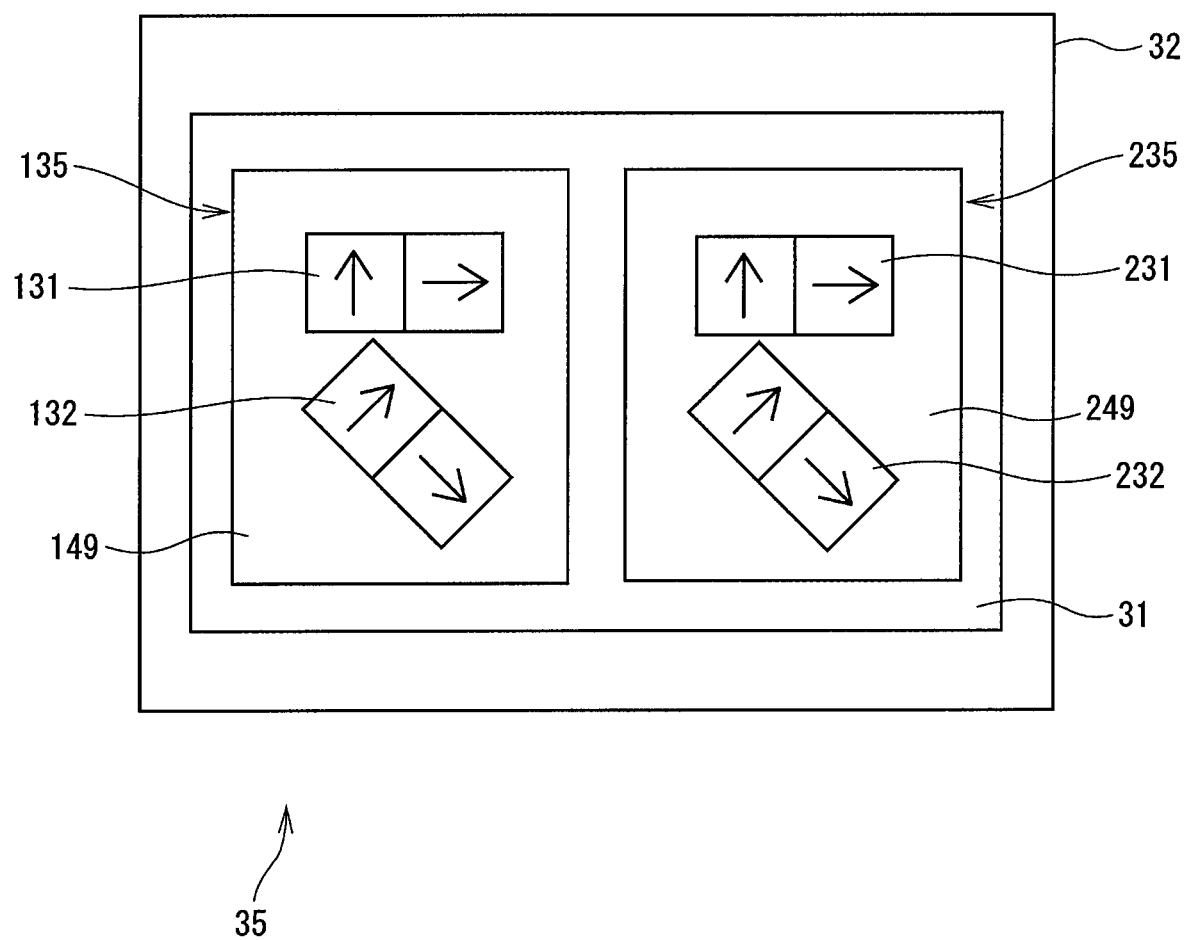
FIG. 18 is a schematic view showing a rotation angle sensor according to the third embodiment.

A third embodiment is shown in FIG. 17 and FIG. 18. A rotation angle sensor 35 includes a first sensor unit 135 and a second sensor unit 235. The first sensor unit 135 outputs the output signal SGN1 to the first control unit 170, and the second sensor unit 235 outputs the output signal SGN2 to the second control unit 270. That is, in the present embodiment, the first sensor unit 135 is included in the first system L1, and the second sensor unit 235 is included in the second system L2.

The first sensor unit 135 includes the magnetic field detection elements 131, 132 and a signal processing unit 148. The second sensor unit 235 includes the magnetic field detection elements 231, 232 and a signal processing unit 248. For the same processing in the sensor units 135 and 235, the description of the second sensor unit 235 is generally simplified.

In the above-described embodiments, the magnetic field detection elements 131 and 231 are used for control and the magnetic field detection elements 132 and 232 are used for abnormality detection. In the present embodiment, the magnetic field detection element 132 and the rotation count unit 144, which are surrounded by a broken line, and the magnetic field detection element 231 and the rotation count unit 244, which are surrounded by a broken line, are also supplied with power from the constant voltage sources 192 and 292, respectively, so that the magnetic detection elements 132 and 232 may also be used for control. Therefore, in the present embodiment, it is preferable that the magnetic field detection elements 131, 132, 231 and 323 have the same accuracy.

As shown in FIG. 18, in the present embodiment, the detection directions of the magnetic field detection elements 131 and 132 in the first sensor unit 135 are shifted by 45°. Similarly, the detection directions of the magnetic field detection elements 231 and 232 in the second sensor unit 235 are shifted by 45°. In the example of FIG. 18, the detection direction is shifted by shifting the arrangement of the magnetic detection elements, but the configuration of the detection element may be different or the configurations of the rotation count units may be different.

The signal processing unit 148 has a rotation count unit 144 that calculates a count value TC1$b$ based on the signal from the magnetic field detection element 132, and a definite region check unit 147 in addition to the configuration of the signal processing unit 140 of the above-described embodiments. Further, in the present embodiment, a value calculated by the rotation count unit 143 based on the signal from the magnetic field detection element 131 is referred to as a count value TC1$a$.

The signal processing unit 248 has a rotation count unit 244 that calculates a count value TC2$b$ based on the signal from the magnetic field detection element 232, and a definite region check unit 247 in addition to the configuration of the signal processing unit 240 of the above-described embodiments. Further, in the present embodiment, a value calculated by the rotation count unit 143 based on the signal from the magnetic field detection element 131 is referred to as a count value TC1$a$.

The definite region check unit 147 checks which of the count values TC1$a$ and TC1$b$ is a value of the definite region Rd. The communication unit 146 sets one of the count values TC1$a$ and TC1$b$ which is in the definite region Rd as the count value TC1, generates the output signal SGN1 including the corresponding mechanical angle $\theta$m1, and transmits it to the first control unit 170.

The definite region check unit 247 checks which of the count values TC1$a$ and TC1$b$ is a value of the definite region Rd. The communication unit 246 sets one of the count values TC2$a$ and TC2$b$ which is in the definite region Rd as the count value TC2, generates the output signal SGN2 including the corresponding mechanical angle $\theta$m2, and transmits it to the second control unit 270.

In the present embodiment, the count values TC1 and TC2 output from the sensor units 130 and 230 are the values of the definite region over the entire region of 360°. Therefore, the absolute angle calculation units 172 and 272 (see FIG. 5) can appropriately calculate the absolute angles $\theta$a1 and $\theta$a2 over the entire region of one rotation of the motor 80 based on the count values TC1 and TC2 acquired in the own system. The absolute angles $\theta$a1 and $\theta$a2 are shared between the control units 170 and 270 via communication. The abnormality check units 175 and 275 perform abnormality checking by comparing the absolute angles $\theta$a1 and $\theta$a2. The abnormality checking is not limited to the comparison of the absolute angles $\theta$a1 and $\theta$a2, but may be count values TC1 and TC2 themselves or values other than the absolute angles $\theta$a1 and $\theta$a2 calculated based on the count values TC1 and TC2.

Thus, the control units 170 and 270 can calculate the absolute angles $\theta$a1 and $\theta$a2 using the count values TC1 and TC2 of the definite region Rd. In FIG. 17, although the definite region check units 147 and 247 are included in the communication units 146 and 246, respectively, these units may be separately provided.

The sensor units 135 and 235 have plural magnetic field detection units. That is, the first sensor unit 135 includes the magnetic field detection units 131 and 132, and the second sensor unit 235 includes the magnetic field detection units 231 and 232. The first sensor unit 135 selects the count values TC1$a$ and TC1$b$, which are in the definite regions from among the count values TC1$a$ and TC1$b$ different in the definite region according to the detection values of the magnetic field detection elements 131 and 132, respectively, and output them to the first control unit 170. Similarly, the second sensor unit 235 selects the count values TC2$a$ and TC2$b$, which are in the definite regions from among the count values TC2$a$ and TC2$b$ of the different definite regions according to the detection values of the magnetic field detection elements 231 and 232, respectively, and output them to the second control unit 270.

The ECU 10 includes the sensor unit 135 and the control unit 170. The sensor unit 135 has plural magnetic detection elements 131 and 231 for detecting the rotation of the motor 80, and outputs the mechanical angles $\theta$m1 and $\theta$m2 related to the rotation angle during one rotation and the count values TC1 and TC2 related to the number of rotations of the motor 80, respectively. The control unit 170 has the signal acquisition unit 171 and the absolute angle calculation unit 172. The signal acquisition unit 171 acquires the mechanical angle $\theta$m1 and the count value TC1 from the sensor unit 130. The absolute angle calculation unit 172 calculates the absolute angle which is the rotation amount from the reference position based on the mechanical angle $\theta$m1 and the count value TC1.

One rotation of the motor 80 is divided into the indefinite regions Ri1, in which the detection deviation of the count value TC1 may occur, and the definite region Rd1, in which no detection deviation occurs. The sensor unit 135 selects the count values TC1$a$ and TC1$b$, which are in the definite regions from among the count values TC1*a* and TC1*b* of the different definite regions according to the detection values of the magnetic field detection elements 131 and 132, respectively, and outputs them to the control unit 170. The same applies to the sensor unit 235 and the control unit 270 of the second system.

In the present embodiment, the region determination is performed in the sensor units 135 and 235, and the values of the definite regions are output to the control units 170 and 270. Therefore, in the control units 170 and 270, the count values TC1 and TC2 acquired from the sensor units 135 and 235 can be used as they are for calculating the absolute angles θa1 and θa2. In addition, even in one system, the absolute angle calculation can be appropriately performed using the count value of the definite region.

The control units 170 and 270 have abnormality check units 175 and 275 that perform abnormality checking by comparing the absolute angles θa1 and θa2 that are values corresponding to the count values TC1 and TC2 output from the respective sensor units 135 and 235. Thereby, the abnormality checking can be appropriately performed. The "value based on the second rotation information" includes the value of the second rotation information itself. The present embodiment also provides the same advantages as those of the above-described embodiments.

Other Embodiments

In the above-described embodiments, the phase difference is shifted so that the indefinite regions do not overlap. In other embodiments, a part of the indefinite region may overlap with the other system. In this case, there is a possibility that an error may occur in the absolute angle calculation in the region where the indefinite regions overlap. However, in comparison with the case where there is no phase difference, the angle range in which either system is in the definite region is widened.

In the above-described embodiments, the first rotation information is the mechanical angle and the second rotation information is the count value. In other embodiments, the first rotation information may be any value that is convertible to the mechanical angle. In other embodiments, the second rotation information may be any value that is convertible to the number of rotations. In the above-described embodiments, one rotation is divided into four regions, and the count value for one rotation of the motor is four. In other embodiments, one rotation may be divided into three, five or more.

In the above-described embodiments, two sensor units and two control units are provided to provide two systems. As other embodiments, the number of systems may be one, three or more. In the above-described embodiments, the number of detection elements of the sensor unit is two. In other embodiments, the number of detection elements provided in one sensor unit may be one, three or more.

In the above-described embodiments, electric power is supplied to the first sensor unit and the second sensor unit from two batteries, respectively, and the output signals are transmitted from two sensor units to two control units, respectively. In other embodiments, electric power may be supplied from a common battery to plural sensor units. Further, the constant voltage source such as the regulator or the like may be provided for each sensor unit or may be shared among the sensor units. In other embodiments, plural sensor units may transmit plural output signals to a common control unit.

In other embodiments, the absolute angle information may be any value that is convertible to the absolute angle. In the above-described embodiments, the sensor unit is the detection element that detects a change in the magnetic field of the magnet. In other embodiments, any other rotation angle detection methods such as a resolver or an inductive sensor may also be used. In addition, the communication unit may be provided for each of transmission information types, i.e., a first communication unit for transmitting the first rotation information and a second communication unit for transmitting the second rotation information, for example.

In the above-described embodiments, the motor is a three-phase brushless motor. In other embodiments, the motor is not limited to the three-phase brushless motor, and any motor may be used. Further, the motor may also be a generator, or may be a motor-generator having both of a motor function and a generator function, i.e., not necessarily be limited to the rotating electric machine.

In the above-described embodiments, the control device having the detection device is applied to the electric power steering apparatus. In other embodiments, the driving device may be applied to other apparatuses different from the electric power steering apparatus. The present disclosure is not limited to the above-described embodiments, and various modifications may be implemented without departing from the spirit of the present disclosure.

What is claimed is:

1. A rotation detection device comprising:
    plural sensor units each including at least one detection element for detecting a rotation of a motor, and configured to output first rotation information related to a rotation angle in one rotation of the motor and second rotation information related to a number of rotations of the motor; and
    a control unit including a signal acquisition unit configured to acquire the first rotation information and the second rotation information from the sensor unit, and an absolute angle calculation unit configured to calculate an absolute angle indicating a rotation amount from a reference position based on the first rotation information and the second rotation information, wherein
    one rotation of the motor is divided into indefinite regions and definite regions in which a detection deviation of the second rotation information is likely to occur and no detection deviation occurs, respectively;
    at least one of the definite regions of the second rotation information is set not to overlap with an other definite region of the second rotation information; and
    the absolute angle calculation unit is configured to calculate the absolute angle in correspondence to a rotation position of the motor by using the second rotation information in the definite region.

2. The rotation detection device according to claim 1, wherein:
    the detection element detects a change in a magnetic field of a detection object; and
    the detection element is positioned to have a detection phase different from that of the detection element of an other one of the plural sensor units.

3. The rotation detection device according to claim 1, wherein:
    the detection element detects a change in a magnetic field of a detection object;
    the plural sensor units includes respective calculation circuits for calculating the second rotation information;

the detection elements of the plural sensor units have a same detection phase; and the calculation circuits of the plural sensor units are set differently to have respective definite regions which do not overlap.

4. The rotation detection device according to claim 1, wherein:

each of the plural sensor units includes plural detection elements as the at least one detection element, selects the second rotation information of the definite region among plural second rotation information of the definite regions corresponding to detection values of the plural detection elements, and outputs a selected second rotation information to the control unit.

5. The rotation detection device according to claim 4, wherein:

the control unit further includes an abnormality check unit which compares the second rotation information output from a corresponding one of the sensor units thereby to check for abnormalities.

6. The rotation detection device according to claim 1, wherein:

one rotation of the motor is divided into plural count regions; and the second rotation information is a count value, which is counted up and down a switching of the plural count regions in correspondence to a rotation direction of the motor.

7. An electric power steering apparatus comprising:

the rotation detection device according to claim 1;

the motor is provided for outputting a torque required for steering of a vehicle; and the control unit calculates at least either one of a rotation angle of a steering shaft and a value corresponding to a tire angle of road wheel.

8. A rotation detection device comprising:

a sensor unit including plural detection elements for detecting a rotation of a motor, and configured to output first rotation information related to a rotation angle in one rotation of the motor and second rotation information related to a number of rotations of the motor; and a control unit including a signal acquisition unit configured to acquire the first rotation information and the second rotation information from the sensor unit, and an absolute angle calculation unit configured to calculate an absolute angle indicating a rotation amount from a reference position based on the first rotation information and the second rotation information, wherein one rotation of the motor is divided into indefinite regions and definite regions in which a detection deviation of the second rotation information is likely to occur and no detection deviation occurs, respectively; and the sensor unit is configured to select the second rotation information of the definite region among plural second rotation information of the definite regions corresponding to detection values of the plural detection elements, and output a selected second rotation information to the control unit.

9. The rotation detection device according to claim 8, wherein:

one rotation of the motor is divided into plural count regions; and the second rotation information is a count value, which is counted up and down a switching of the plural count regions in correspondence to a rotation direction of the motor.

10. An electric power steering apparatus comprising:

the rotation detection device according to claim 8;

the motor is provided for outputting a torque required for steering of a vehicle; and the control unit calculates at least either one of a rotation angle of a steering shaft and a value corresponding to a tire angle of road wheel.

* * * * *